US008488840B2

(12) United States Patent
Fukumoto et al.

(10) Patent No.: US 8,488,840 B2
(45) Date of Patent: Jul. 16, 2013

(54) IMAGE PROCESSING DEVICE, IMAGE PROCESSING METHOD AND ELECTRONIC APPARATUS

(75) Inventors: Shinpei Fukumoto, Osaka (JP); Satoru Takeuchi, Osaka (JP); Kazuhiro Kojima, Osaka (JP); Norikazu Tsunekawa, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 458 days.

(21) Appl. No.: 12/606,411

(22) Filed: Oct. 27, 2009

(65) Prior Publication Data
US 2010/0103192 A1  Apr. 29, 2010

(30) Foreign Application Priority Data
Oct. 27, 2008 (JP) .................................. 2008-275218

(51) Int. Cl.
*G06K 9/18* (2006.01)
(52) U.S. Cl.
USPC ............................ 382/103; 382/118; 396/153
(58) Field of Classification Search
None
See application file for complete search history.

(56) References Cited

U.S. PATENT DOCUMENTS

| 6,275,258 | B1* | 8/2001 | Chim ........................ 348/211.12 |
| 6,504,539 | B1* | 1/2003 | Hiraki ........................... 345/427 |
| 6,661,450 | B2 | 12/2003 | Yata |
| 7,526,193 | B2* | 4/2009 | Minato et al. ................. 396/123 |
| 7,916,894 | B1* | 3/2011 | Dhillon et al. ................ 382/103 |
| 2002/0161561 | A1 | 10/2002 | Sarma et al. |
| 2004/0105004 | A1* | 6/2004 | Rui et al. ...................... 348/159 |
| 2005/0151837 | A1* | 7/2005 | Cutler .............................. 348/36 |
| 2006/0198554 | A1* | 9/2006 | Porter et al. .................. 382/159 |
| 2007/0005795 | A1 | 1/2007 | Gonzalez |
| 2007/0014485 | A1* | 1/2007 | McAlpine et al. ............ 382/276 |
| 2007/0236762 | A1* | 10/2007 | Tsuji ............................... 358/537 |
| 2007/0286588 | A1* | 12/2007 | Hatano et al. ................... 396/88 |
| 2007/0286590 | A1* | 12/2007 | Terashima .................... 396/125 |
| 2008/0013787 | A1* | 1/2008 | Kobayashi .................... 382/103 |
| 2008/0075338 | A1* | 3/2008 | Muramatsu et al. .......... 382/118 |
| 2008/0187173 | A1* | 8/2008 | Kim et al. ..................... 382/103 |

(Continued)

FOREIGN PATENT DOCUMENTS

| JP | 2000295517 | 10/2000 |
| JP | 2001169169 | 6/2001 |

(Continued)

OTHER PUBLICATIONS

Yoav Freund and Robert E. Schapire; A Decision-theoretic generalization of on-line learning and an application to boosting; Sep. 20, 1995; pp. 1-34.

*Primary Examiner* — James A Thompson
*Assistant Examiner* — David H Chu
(74) *Attorney, Agent, or Firm* — NDQ&M Watchstone LLP

(57) ABSTRACT

A clipping processing portion is provided with: a subject detection portion that detects a main subject and a sub-subject from an input image; a degree-of-relationship calculation portion that calculates the degree of relationship between the main subject and the sub-subject; a clip region setting portion that sets a clip region based on the positions of the main subject and the sub-subject in the input image and the degree of relationship; a clipping portion that clips the clip region from the input image. The clip region setting portion sets the clip region so as to include the main subject and the sub-subject having the high degree of relationship thereof.

9 Claims, 13 Drawing Sheets

U.S. PATENT DOCUMENTS

| | | | | |
|---|---|---|---|---|
| 2008/0239092 A1* | 10/2008 | Sugino et al. | | 348/222.1 |
| 2009/0060321 A1* | 3/2009 | Gillard et al. | | 382/154 |
| 2009/0290791 A1* | 11/2009 | Holub et al. | | 382/164 |
| 2010/0226636 A1* | 9/2010 | Hirai et al. | | 396/123 |
| 2011/0080504 A1* | 4/2011 | Akahori | | 348/240.2 |

FOREIGN PATENT DOCUMENTS

| | | |
|---|---|---|
| JP | 2004194309 | 7/2004 |
| JP | 2008109552 | 5/2008 |
| JP | 2009004873 | 1/2009 |

* cited by examiner

Ya=4.72

Yb=2.86

IMAGE PROCESSING DEVICE, IMAGE PROCESSING METHOD AND ELECTRONIC APPARATUS

This nonprovisional application claims priority under 35 U.S.C. §119(a) on Patent Application No. 2008-275218 filed in Japan on Oct. 27, 2008, the entire contents of which are hereby incorporated by reference.

BACKGROUND OF THE INVENTION

1. Field of the Invention

The present invention relates to an image processing device that clips a portion of an input image to obtain a desired clipped image, an image processing method and an electronic apparatus incorporating such an image processing device.

2. Description of the Related Art

In recent years, image sensing devices, such as a digital still camera and a digital video camera, that sense an image with an image sensor such as a CCD (charge coupled device) or a CMOS (complimentary metal oxide semiconductor) sensor and display devices, such as a liquid crystal display, that display an image have been widely used. As these sensing devices and display devices, there are provided devices that clip a predetermined region from an image to be processed (hereinafter referred to as an input image) and that record and display the image of the clipped region (hereinafter, a clipped image).

Such clipping processing allows the shooting of an image to be simplified. Specifically, for example, an input image of a wide angle of view is shot by a user, and the clipping processing is performed on the obtained input image such that a region is clipped where a subject (hereinafter, a main subject) to which the user especially wishes to pay attention is located at its center. Since this clipping processing allows an image where the main subject is located at its center to be obtained, it is possible to eliminate the need for the user to concentrate on following the main subject when an image is shot. In particular, simply directing the image sensing device toward the main subject is all that is required. Moreover, by detecting the main subject from the input image to perform the clipping processing based on the location of the detected main subject, it is possible to automatically obtain the image where the main subject is located at its center.

However, when a subject (hereinafter referred to as a sub-subject), other than the main subject, that interacts with the main subject is included in the input image, if the clipping processing is performed with the main subject at its center, a clipped image that excludes the sub-subject may be generated. In this case, the interaction between the main subject and the sub-subject is not included in the clipped image, and, in the clipped image, the behavior of the main subject is not clearly expressed. This results in a problem.

To overcome the foregoing problem, there is proposed a display method in which a clip region is set to include a plurality of objects detected from an input image, and in which display is performed. With this display method, it is possible to include a plurality of subjects in the clipped image.

However, when the clipped image is obtained that simply includes a plurality of subjects, a clipped image is generated which includes an unnecessary sub-subject unrelated to the main subject. This disadvantageously makes it difficult to obtain a clipped image in which emphasis is placed on the main subject.

SUMMARY OF THE INVENTION

According to one aspect of the present invention, there is provided an image processing device including: a subject detection portion that detects predetermined subjects from an input image and that sets one of the detected subjects as a main subject and another of the detected subjects as a sub-subject; a determination portion that determines a relationship between the main subject and the sub-subject detected by the subject detection portion; a clip region setting portion that sets a clip region in the input image based on positions of the main subject and the sub-subject in the input image and the relationship; and a clipping portion that clips the clip region from the input image to generate a clipped image.

According to another aspect of the invention, there is provided an electronic apparatus including: the image processing device described above, in which the clipped image output from the image processing device is recorded or displayed.

According to another aspect of the invention, there is provided an image processing method including: a first step of detecting predetermined subjects from an input image and setting one of the detected subjects as a main subject and another of the detected subjects as a sub-subject; a second step of determining a relationship between the main subject and the sub-subject set in the first step; a third step of setting a clip region in the input image based on positions of the main subject and the sub-subject in the input image and the relationship determined in the second step; and a fourth step of clipping, from the input image, the clip region set in the third step to generate a clipped image.

BRIEF DESCRIPTION OF TILE DRAWINGS

DETAILED DESCRIPTION OF PREFERRED EMBODIMENTS

An embodiment of the present invention will be described below with reference to the accompanying drawings. An image sensing device that is an example of an electronic apparatus according to the invention will first be described. The image sensing device, which will be described below, is an image sensing device, such as a digital camera, that can record sound, moving images and still images.

<<Electronic Apparatus: Clipping Processing on Recording>>

Figure 1:
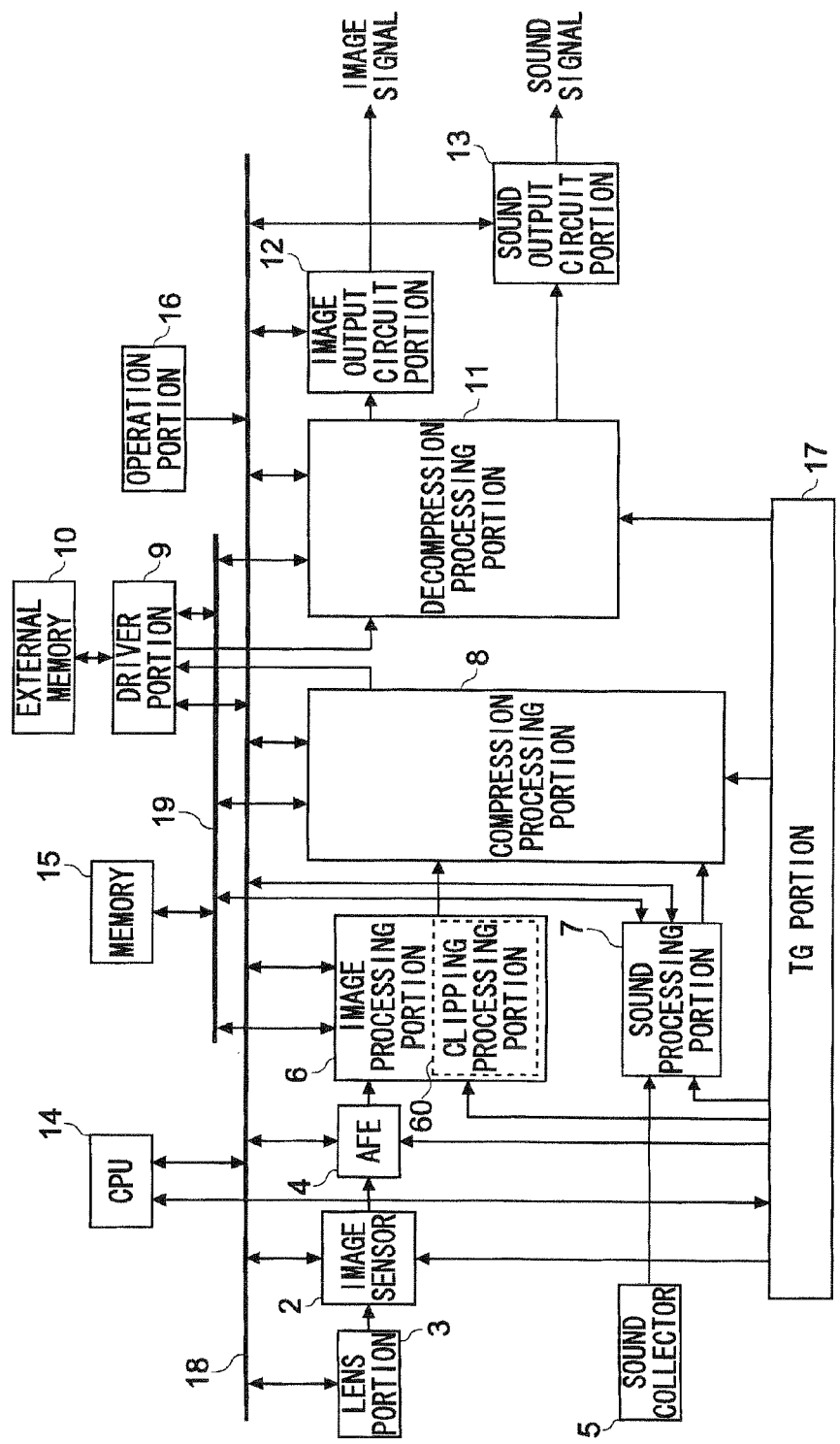
FIG. 1 is a block diagram showing the configuration of an image sensing device according to an embodiment of the present invention.

The configuration of the image sensing device will first be described with reference to FIG. 1. FIG. 1 is a block diagram showing the configuration of the image sensing device according to the embodiment of the invention. The image sensing device 1 shown in FIG. 1 performs clipping processing on a sensed image, and records the obtained clipped image.

As shown in FIG. 1, the image sensing device 1 is provided with: an image sensor 2 that is formed with a solid-state image sensing element, such as a CCD or CMOS sensor, which converts an incoming optical image into an electrical signal; and a lens portion 3 that forms the optical image of a subject on the image sensor 2 and that adjusts the amount of light or the like. The lens portion 3 and the image sensor 2 together constitute an image sensing portion, and the image sensing portion generates an image signal. The lens portion 3 is provided with: various lenses (not shown), such as a zoom lens and a focus lens; and an aperture stop (not shown) for adjusting the amount of light that enters the image sensor 2.

The image sensing device 1 is further provided with: an AFE (analog front end) 4 that converts the image signal in the form of an analog signal output from the image sensor 2 into a digital signal and that adjusts gain; a sound collector 5 that converts an input sound into an electrical signal; an image processing portion 6 that converts an image signal serving as a R (red), G (green) or B (blue) digital signal output from the AFE 4 into a signal using Y (brightness signal), U or V (color difference signal) and that performs various types of image processing on the image signal; a sound processing portion 7 that converts a sound signal in the form of an analog signal output from the sound collector 5 into a digital signal; a compression processing portion 8 that performs compression-encoding processing for a still image, such as by a JPEG (joint photographic experts group) compression method, on the image signal output from the image processing portion 6 or that performs compression-encoding processing for a moving image, such as by an MPEG (moving picture experts group) compression method, on the image signal output from the image processing portion 6 and the sound signal output from the sound processing portion 7; an external memory 10 that records a compressed-encoded signal resulting from the compression-encoding by the compression processing portion 8; a driver portion 9 that records and reads the compressed-encoded signal in and from the external memory 10; and a decompression processing portion 11 that decompresses and decodes the compressed-encoded signal which is read from the external memory 10 by the driver portion 9. The image processing portion 6 is provided with a clipping processing portion 60 that clips a portion of the image signal input thereto to obtain a new image signal.

The image sensing device 1 is further provided with: an image output circuit portion 12 that converts an image signal resulting from the decoding by the decompression processing portion 11 into a signal in a form that can be displayed on a display device (not shown) such as a display; and a sound output circuit portion 13 that converts a sound signal resulting from the decoding by the decompression processing portion 11 into a signal in a form that can be played back on a playback device (not shown) such as a speaker.

The image sensing device 1 is further provided with: a CPU (central processing unit) 14 that controls the overall operation within the image sensing device 1; a memory 15 that stores programs for performing various types of processing and that temporarily stores signals during the execution of the programs; an operation portion 16 which is composed of a button for starting the image sensing, a button for determining various settings and the like and through which an instruction from a user is input; a timing generator (TG) portion 17 that outputs a timing control signal for synchronizing the operations of individual portions; a bus 18 through which signals are exchanged between the CPU 14 and the individual portions; and a bus 19 through which signals are exchanged between the memory 15 and the individual portions.

The external memory 10 may be of any type as long as it can record image signals and sound signals. For example, a semiconductor memory such as an SD (secure digital) card, an optical disc such as a DVD or a magnetic disk such as a hard disk can be used as the external memory 10. The external memory 10 may be removable from the image sensing device 1.

The basic operation of the image sensing device 1 will now be described with reference to FIG. 1. The image sensing device 1 photoelectrically converts, with the image sensor 2, light incoming through the lens portion 3 to acquire an image signal in the form of an electrical signal. Then, in synchronism with the timing control signal input from the TG portion 17, the image sensor 2 sequentially outputs the image signal to the AFE 4 at a predetermined frame period (for example, 1/30 second). The image signal is converted from an analog signal to a digital signal by the AFE 4, and is then input to the image processing portion 6. The image processing portion 6 converts the image signal into a signal using YUV, and performs various types of image processing such as gradation correction and edge enhancement. The memory 15 operates as a frame memory and temporarily holds the image signal when the image processing portion 6 performs processing.

Here, based on the image signal input to the image processing portion 6, the lens portion 3 adjusts the position of the individual lenses to adjust focus, and also adjusts the aperture of the aperture stop to adjust exposure. The adjustment of focus and exposure here is automatically performed according to a predetermined program such that each optimal condition is achieved, or is manually performed according to an instruction from the user. The clipping processing portion 60 provided in the image processing portion 6 performs the clipping processing to clip a portion of the image signal input thereto to generate a new image signal.

When a moving image is recorded, not only an image signal but also a sound signal is recorded. The sound signal that results from the conversion into an electrical signal by the sound collector 5 and that is output therefrom is input to the sound processing portion 7, where the sound signal is digitized and is subjected to processing such as noise elimination. The image signal output from the image processing portion 6 and the sound signal output from the sound processing portion 7 are input together to the compression processing portion 8, where the signals are compressed by a predetermined compression method. Here, the image signal is made to correspond in time to the sound signal such that the sound and the image are synchronized on playback. The compressed image signals and sound signals are recorded in the external memory 10 through the driver portion 9.

On the other hand, when either a still image or a sound alone is recorded, either an image signal or a sound signal is compressed by a predetermined compression method in the compression processing portion 8, and is then recorded in the external memory 10. The processing performed in the image processing portion 6 may differ between the recording of a moving image and the recording of a still image.

The compressed image signals and sound signals recorded in the external memory 10 are read by the decompression processing portion 11 based on an instruction from the user. The decompression processing portion 11 decompresses the compressed image signals and sound signals, and then outputs the image signal to the image output circuit portion 12 and the sound signal to the sound output circuit portion 13. The image output circuit portion 12 and the sound output circuit portion 13 convert these signals into signals in forms that can be displayed and played back on the display device and the speaker, respectively, and outputs these signals.

The display device and the speaker may be formed integrally with the image sensing device 1, or may be formed separately therewith in which they are connected by terminals, cables or the like provided in the image sensing device 1.

In a so-called preview mode in which an image displayed on the display device or the like is checked by the user without the image signal being recorded, the image signal output from the image processing portion 6 may be output to the image output circuit portion 12 without being compressed. When the image signal of a moving image is recorded, the image signal is compressed by the compression processing portion 8 and recorded in the external memory 10, and, simultaneously, the image signal may also be output through the image output circuit portion 12 to the display device or the like.

It is assumed that the clipping processing portion 60 provided in the image processing portion 6 can acquire, as necessary, various types of information (for example, a sound signal) from the individual portions (for example, the sound processing portion 7) of the image sensing device 1. In FIG. 1, however, arrows indicating that such information is input to the clipping processing portion 60 are omitted.

<Clipping Processing Portion>

Figure 2:
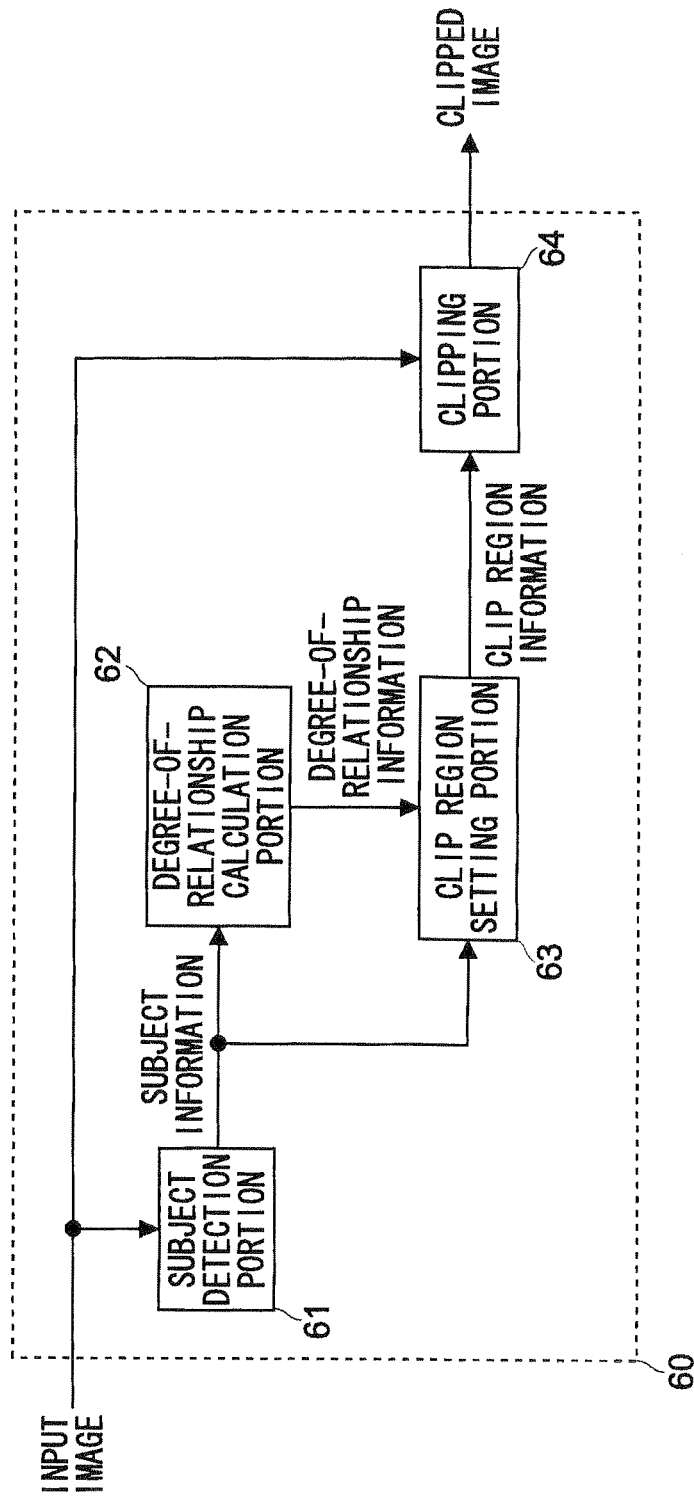
FIG. 2 is a block diagram showing the configuration of a clipping processing portion incorporated in the image sensing device according to the embodiment of the invention.

The configuration of the clipping processing portion 60 shown in FIG. 1 will now be described with reference to the relevant drawing. FIG. 2 is a block diagram showing the configuration of the clipping processing portion provided in the image sensing device according to the embodiment of the invention. In the following description, for specific discussion, the image signal that is input to the clipping processing portion 60 and that is subjected to clipping processing is expressed as an image and is referred to as an "input image." On the other hand, the image signal output from the clipping processing portion 60 is referred to as a "clipped image."

As shown in FIG. 2, the clipping processing portion 60 is provided with: a subject detection portion 61 that detects a subject from an input image to output subject information representing the state of the subject in the input image; a degree-of-relationship calculation portion 62 that calculates, based on the subject information output from the subject detection portion 61, the degree of relationship to output degree-of-relationship information; a clip region setting portion 63 that sets, based on the subject information output from the subject detection portion 61 and the degree-of-relationship information output from the degree-of-relationship calculation portion 62, the clip region to output clip region information; and a clipping portion 64 that performs, based on the clip region information output from the clip region setting portion 63, the clipping processing on the input image to generate a clipped image.

The subject information generated and output by the subject detection portion 61 can include various types of information on a main subject and a sub-subject detected from the input image. For example, the subject information can include pieces of information on the position, the size, the orientation, the movement size and direction, the color and the like of the main subject and the sub-subject in the input image. These are just examples, and any other type of information may be included in the subject information.

The degree of relationship calculated by the degree-of-relationship calculation portion 62 indicates the strength of relationship between the main subject and the sub-subject detected by the subject detection portion 61. The strength of relationship indicates, for example, the possibility that the main subject and the sub-subject perform the related operation (such as conversation) and the possibility that they belong to the same group (such as relatives or a school).

The clip region information output by the clip region setting portion 63 specifies a clip region that is a given region in the input image, such as by the use of the coordinates of the input image. The size of the clip region may vary according to the subject information or the degree-of-relationship information, or may be constant.

Figure 3:
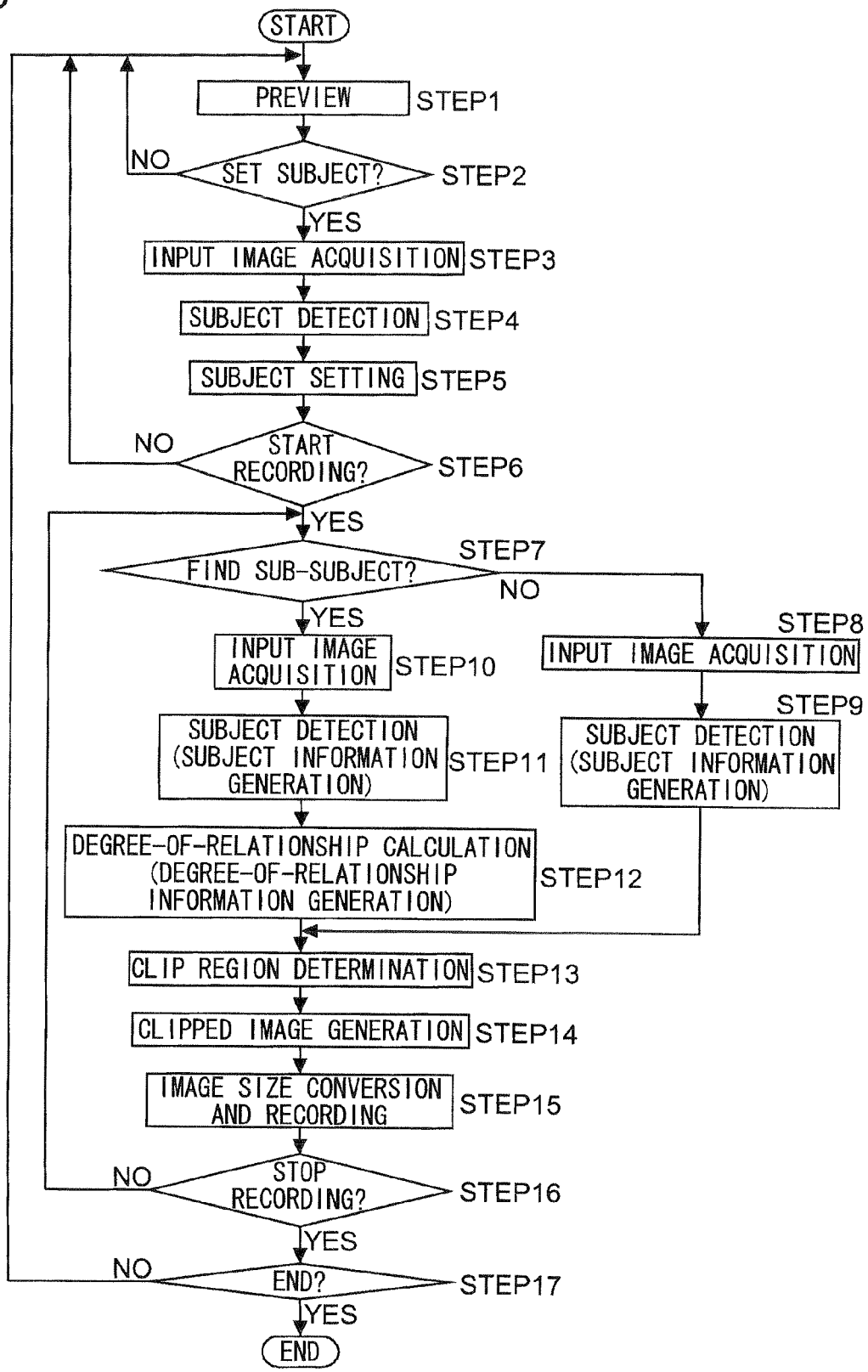
FIG. 3 is a flowchart showing an example of the operation of the clipping processing portion.

An example of the operation of the clipping processing portion 60 will be described with reference to the relevant drawings. FIG. 3 is a flowchart showing the example of the operation of the clipping processing portion. FIG. 3 shows not only the example of the operation of the clipping processing portion 60 but also an example of the operation of the image sensing device 1 as a whole.

As shown in FIG. 3, when an image sensing operation involving the clipping processing is started, the preview is first performed (step 1). During the preview, images generated in the image sensing portion one after another are sequentially displayed on the display device. It is assumed that the images generated here are not recorded in the external memory 10.

Whether or not an instruction to set a subject is input from the user is checked (step 2). For example, whether or not this instruction is present may be checked by determining whether or not a shutter button, which is an example of the operation portion 17, is halfway pressed by the user. If the instruction to set a subject is not input (step 2, no), the process returns to step 1, where the preview is continuously performed.

On the other hand, if the instruction to set a subject is input from the user (step 2, yes), the clipping processing portion 60 first acquires the input image (step 3). Then, the subject detection portion 61 detects a subject in the input image acquired in step 3 (step 4). As the method of detecting a subject, for example, face-detection processing described below can be utilized.

Figure 4:
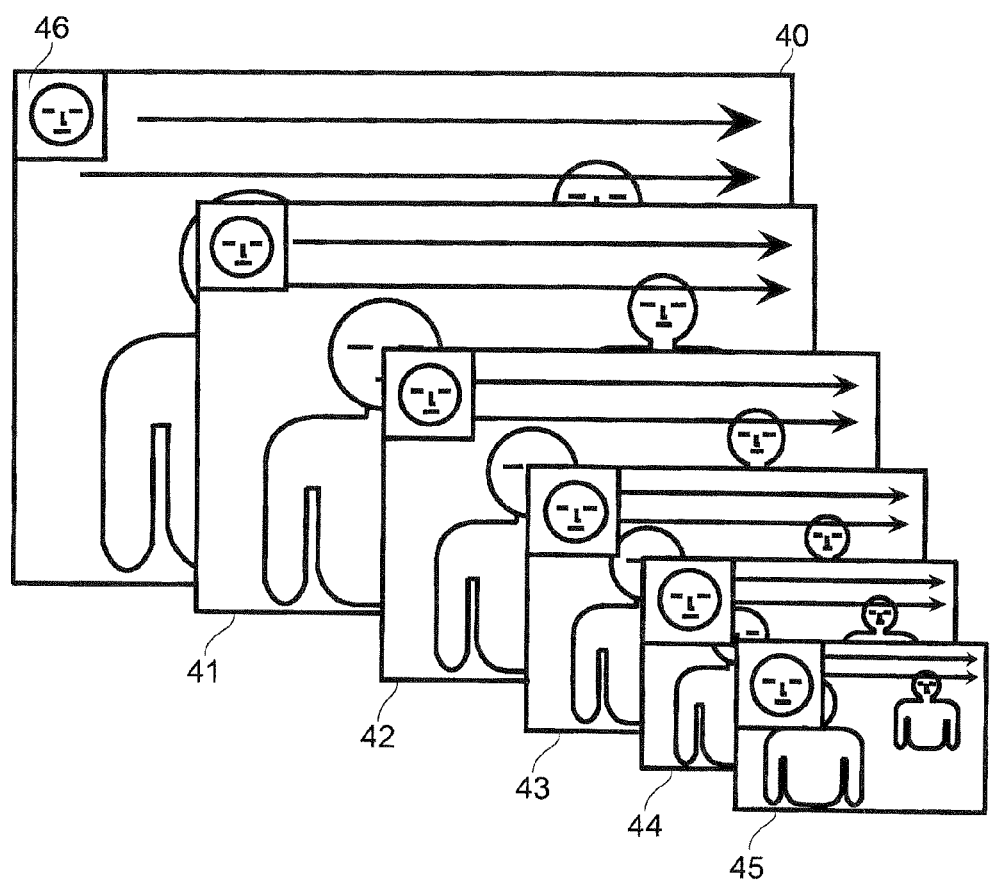
FIG. 4 is a schematic diagram of an image showing an example of face-detection processing.

An example of the face-detection processing will be described with the relevant drawings. FIG. 4 is a schematic diagram of an image showing the example of the face-detection processing. The method shown in FIG. 4 is just an example, and any known processing method may be used as the face-detection processing.

In this example, the input image and a weight table are compared, and thus a face is detected. The weight table is determined from a large number of teacher samples (face and non-face sample images). Such a weight table can be made by utilizing, for example, a known learning method called "Adaboost" (Yoav Freund, Robert E. Schapire, "A decision-theoretic generalization of on-line learning and an application to boosting", European Conference on Computational Learning Theory, Sep. 20, 1995). This "Adaboost" is one of adaptive boosting learning methods in which, based on a large number of teacher samples, a plurality of weak classifiers that are effective for distinction are selected from a plurality of weak classifier candidates, and in which they are weighed and integrated to provide a high accuracy classifier. Here, the weak classifier refers to a classifier that performs classification more accurately than simply accidentally but does not have a sufficiently high accuracy. When weak classifiers are selected, if there already exist selected weak classifiers, learning is intensively performed on teacher samples that erroneously carry out recognition by the effect of the already selected classifiers, with the result that the most effective weak classifiers are selected from the remaining weak classifier candidates.

As shown in FIG. 4, reduced images 41 to 45 are first generated from an input image 40 by a reduction factor of, for example, 0.8 and are then arranged hierarchically. Determination areas 46 in which determination is performed on the images 40 to 45 are equal in size to each other. As indicated by arrows in the figure, the determination areas 46 are moved from left to right on the images to perform horizontal scanning. This horizontal scanning is performed from top to bottom to scan the entire image. Here, a face image that matches the determination area 46 is detected. In this case, in addition to the input image 40, a plurality of reduced images 41 to 45 are generated, and this allows different-sized faces to be detected with one type of weight table. The scanning order is not limited to the order described above, and the scanning may be performed in any order.

The matching is composed of a plurality of determination steps that are performed in ascending order of determination accuracy. When no face is detected in a determination step, the process does not proceed to the subsequent determination step, and it is determined that there is no face in the determination area 46. Only when a face is detected in all the determination steps, it is determined that a face is in the determination area 46, the process proceeds to determination steps in the subsequent determination area 46. With this face-detection processing, it is possible to detect the face of a figure included in the input image.

The main subject and the sub-subject are set from the subjects detected in step 4 (step 5). In particular, any one of the detected subjects is set as the main subject. For example, when the face-detection processing is used as described above, a subject having the largest face in the input image may be set as the main subject. For example, a subject having a face that is located closest to the center of the input image may also be set as the main subject. For example, a plurality of faces detected are displayed to the user, and a subject having a face selected by the user may also be set as the main subject. For example, the face of a specific person is recorded as a sample, and a subject having a face that is recognized as the face of the specific person may also be set as the main subject. Furthermore, with a method obtained by combining these methods for setting a main subject, the main subject may be determined.

In step 5, in addition to the main subject, the sub-subject is set. A plurality of sub-subjects can be set; the detected subjects other than the main subject may all be set as the sub-subject. For example, when only one subject is detected and that subject is set at the main subject, no subject may be set as the sub-subject.

After, in step 5, the main subject and the sub-subject are set, whether or not an instruction to start recording is input from the user is checked (step 6). For example, whether or not this instruction is present may be checked by determining whether or not a shutter button, which is an example of the operation portion 17, is fully pressed by the user. If the instruction to start the recording is not input (step 6, no), the process returns to step 1, where the preview is performed. Here, by performing the operations in steps 2 to 5 again, the subject may be reset.

On the other hand, if the instruction to start the recording is input from the user (step 6, yes), whether or not the sub-subject is set in step 5 is first checked (step 7). The case where the sub-subject is not set (step 7, no) refers to either the case where the main subject is only set or the case where even main subject is not set. Here, if the main subject is set, the clipping processing portion 60 acquires the input image (step 8), and the subject detection portion 61 detects the main subject from the input image acquired in step 8 to generate the subject information (step 9). If the main subject is not set, the subject detection portion 61 generates the subject information indicating that the main subject is not set.

If, in step 5, the main subject and the sub-subject are set (step 7, yes), the clipping processing portion 60 acquires the input image (step 10), and the subject detection portion 61 detects the main subject and the sub-subject from the input image acquired in step 10 to generate the subject information (step 11). Then, the degree-of-relationship calculation portion 62 calculates the degree of relationship based on the subject information generated in step 11 to generate the degree-of-relationship information (step 12). The method of calculating the degree of relationship will be described in detail later.

In the subject detection performed in step 9 and step 11, the main subject and the sub-subject set in step 5 are tracked, and thus the subject is detected. The detection of the subject is continuously performed as follows: for example, the result (for example, the detected position) obtained by detecting the subject in an input image is utilized for the detection of the main subject in an input image that is acquired subsequently; and the characteristic of the subject (for example, the color of the body of the subject) is recognized, and the same subject as the detected subject is detected from input images that are sequentially acquired in step 8 and step 10.

If the subject information is generated in step 9, the clip region setting portion 63 sets the clip region based on only the subject information to generate the clip region information (step 13). If the main subject is only detected in step 9, for example, the clip region where the main subject is located substantially at its center is set. If the subject is not detected in step 9, a predetermined region (for example, a center region) in the input image is set as the clip region.

On the other hand, if the subject information is generated in step 11, and the degree-of-relationship information is generated in step 12, the clip region setting portion 63 sets, based on the subject information and the degree-of-relationship information, the clip region to generate the clip region information (step 13). Then, the clipping portion 64 performs, based on the clip region information, the clipping processing on the input image to generate the clipped image (step 14). The method of setting, based on the degree-of-relationship information, the clip region by the clip region setting portion 63 will be described in detail later.

The clipped image generated in step 14 is varied in the number of pixels, as necessary, by the image processing portion 6, and is compressed by the compression processing portion 8 and is thereafter recorded in the external memory 10 (step 15). Here, the image processing portion 6 performs enlargement processing (for example, processing for performing interpolation or the like on pixels to increase the number of pixels) and reduction processing (for example, processing for performing addition, skipping or the like on pixels to reduce the number of pixels) on the clipped image to vary the number of pixels, with the result that an image to be recorded having a predetermined size is generated. In particular, it is desirable to perform this processing when the clip region is undefined, because the sizes of to-be-recorded images can be equal to each other.

The to-be-recorded image is recorded in step 15, and then whether or not an instruction to stop the recording is input from the user is checked (step 16). For example, whether or not this instruction is present may be checked by determining whether or not a recording stop button, which is an example of the operation portion 17, is pressed by the user. If the instruction to stop the recording is not input (step 16, no), the process returns to step 7, where the clipping processing is performed on the subsequent input image.

On the other hand, if the instruction to stop the recording is input (step 16, yes), whether or not the operation of the image sensing device 1 is completed is checked (step 17). For example, whether or not this instruction is present may be checked by determining whether or not a power supply button, which is an example of the operation portion 17, is pressed by the user. If the instruction to complete the operation of the image sensing device 1 is not input (step 17, no), the process returns to step 1, where the preview is performed. On the other hand, if the instruction to complete the operation of the image sensing device 1 is input (step 17, yes), the operation is completed.

<<Electronic Apparatus: Clipping on Playback>>

The above-described image sensing device 1 has the clipping processing portion 60 in the image processing portion 6, performs the clipping processing on the image obtained in the image sensing portion and stores the resulting image in the external memory 10. However, the electronic apparatus of the invention can be configured to perform the clipping processing when an image is played back, as described below. In the following description, the electronic apparatus will also be described by way of example using the image sensing device.

Figure 5:
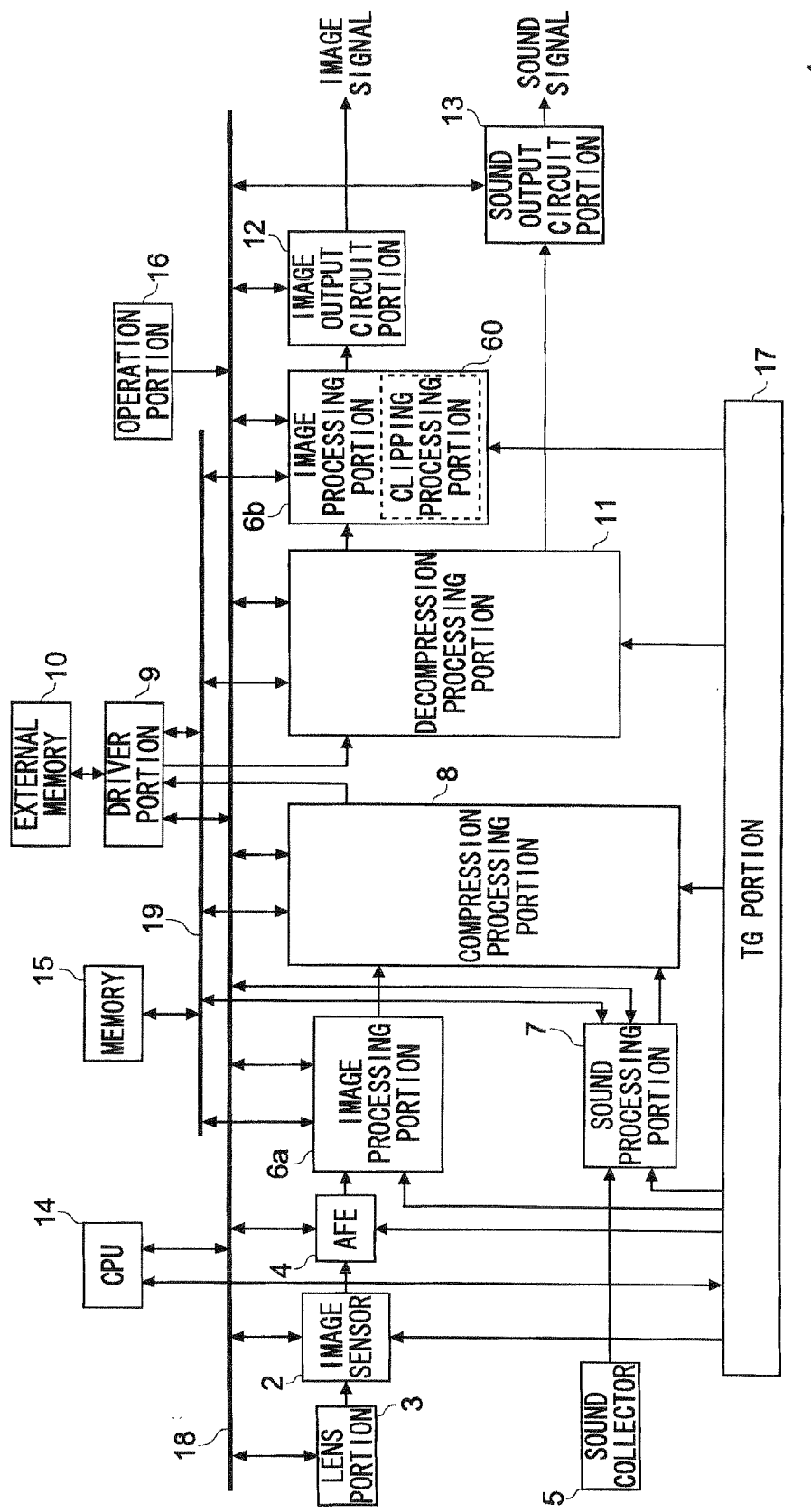
FIG. 5 is a block diagram showing the configuration of another example of the image sensing device according to the embodiment of the invention.

The configuration of the image sensing device will be described with reference to FIG. 5. FIG. 5 is a block diagram showing the configuration of another example of the image sensing device according to the embodiment of the invention. The same parts as the image sensing device 1 shown in FIG. 1 are identified with common symbols, and their detailed description will not be repeated.

The configuration of the image sensing device 1a shown in FIG. 5 is similar to that of the image sensing device 1 of FIG. 1 except that, instead of the image processing portion 6, an image processing portion 6a is provided, and that an image processing portion 6b is further provided which performs processing on the image signal input from the decompression processing portion 11 to output the resulting signal to the image output circuit portion 12. The configuration of the image processing portion 6a is similar to that of the image processing portion 6 shown in FIG. 1 except that the clipping processing portion 60 is not provided. On the other hand, the image processing portion 6b is provided with the clipping processing portion 60.

In the image sensing device 1a shown in FIG. 5, the compressed-encoded signal recorded in the external memory 10 is read by the decompression processing portion 11, and is decoded in the decompression processing portion 11 into an image signal, and the image signal is output. This image signal is input to the image processing portion 6b and the clipping processing portion 60, and thus the image processing and the clipping processing are performed. Then, the image signal output from the image processing portion 6b is input to the image output circuit portion 12, and is converted into a signal in a form that can be displayed on the display device or the like and then the resulting signal is output.

The image sensing device 1a may exclude the image sensor 2, the lens portion 3, the AFE 4, the sound collector 5, the image processing portion 6a, the sound processing portion 7 and the compression processing portion 8. In other words, the image sensing device 1a may be a playback device having only a playback function. The image signal output from the image processing portion 6b may be displayed (or may not be displayed) and recorded in the external memory 10. In other words, the image sensing device 1a may be an electronic apparatus that performs the clipping processing when an image is edited.

Figure 6:
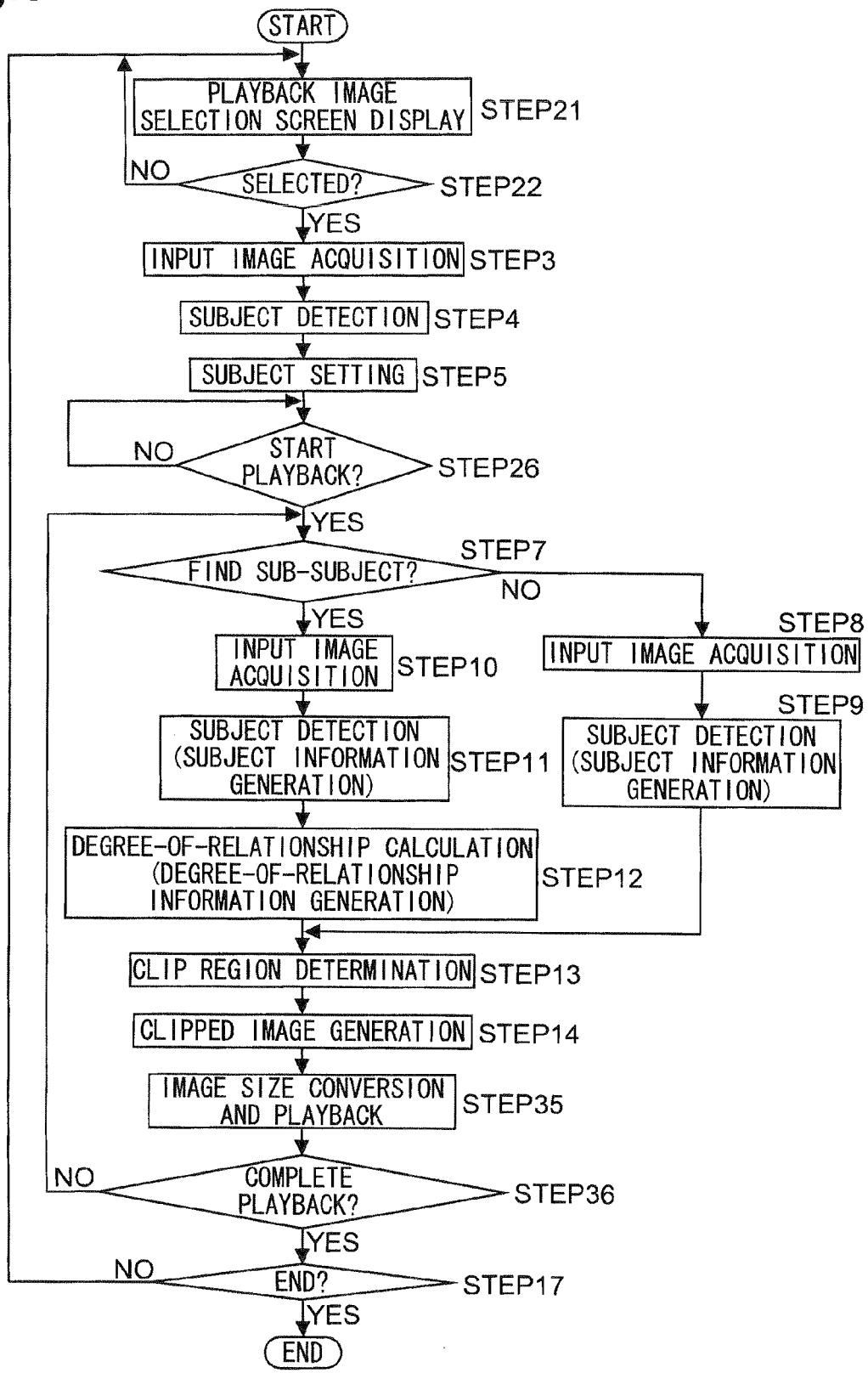
FIG. 6 is a flowchart showing another example of the operation of the clipping processing portion.

An example of the operation of the clipping processing portion 60 incorporated in the image processing portion 6b will now be described with reference to the relevant drawings. FIG. 6 is a flowchart showing another example of the operation of the clipping processing portion. FIG. 6 shows not only the example of the operation of the clipping processing portion 60 but also an example of the entire operation of the image sensing device 1a. FIG. 6 corresponds to FIG. 3, which shows the operation of the clipping processing portion 60 when the clipping processing is performed on the recording. In FIG. 6, the same operations as in FIG. 3 are identified with common step numbers, and their detailed description will not be repeated.

As shown in FIG. 6, when a playback operation involving the clipping operation is started, a screen for selecting an image to be played back is first displayed (step 21). For example, an array of thumbnail images for the images recorded in the external memory 10 or the like is displayed on the display device.

Whether or not an instruction to select an image to be played back is input from the user is checked (step 22). For example, it is alternatively possible to have the user select the image to be played back with a touch panel, a direction key or the like which is an example of the operation portion 17. If the image to be played back is not selected (step 22, no), the process returns to step 21, where the screen for selecting the image to be played back is continuously displayed.

On the other hand, if the instruction to select the image to be played back is input from the user (step 22, yes), the clipping processing portion 60 acquires the input image (step 3). This input image is recorded in the external memory 10 and is output from the decompression processing portion 11. Then, the subject detection portion 61 detects the subjects in the input image acquired in step 3 (step 4). Then, the main subject and the sub-subject are set from the subjects detected in step 4 (step 5).

After, in step 5, the main subject and the sub-subject are set, whether or not an instruction to start playback is input from the user is checked (step 26). For example, whether or not this instruction is present may be checked by determining whether or not a playback start button, which is an example of the operation portion 17, is pressed by the user. If the instruction to start the playback is not input (step 26, no), the process remains on standby until the instruction to start the playback is input. Here, the process may return to step 4, where the subject is reset, or may return to step 3, where the input image is reacquired and the subject is reset.

On the other hand, if the instruction to start the playback is input from the user (step 26, yes), whether or not the sub-subject is set in step 5 is checked (step 7). If the sub-subject is not set (step 7, no) and the main subject is set, the clipping processing portion 60 acquires the input image (step 8), and the subject detection portion 61 detects the main subject from the input image acquired in step 8 to generate the subject information (step 9). If the main subject is not set, the subject detection portion 61 generates the subject information indicating that the main subject is not set (step 9).

If the main subject and the sub-subject are set (step 7, yes), the clipping processing portion 60 acquires the input image (step 10), and the subject detection portion 61 detects the main subject and the sub-subject from the input image acquired in step 10 to generate the subject information (step 11). The degree-of-relationship calculation portion 62 calculates, based on the subject information generated in step 11, the degree of relationship to generate the degree-of-relationship information (step 12). The method of calculating the degree of relationship will be described in detail later.

The clip region setting portion 63 sets, based on the subject information, the position of the main subject and the degree-of-relationship information, the clip region to generate the clip region information (step 13). Then, the clipping portion 64 performs, based on the clip region information, the clipping processing on the input image to generate the clipped image (step 14). The method of setting, based on the degree-of-relationship information, the clip region by the clip region setting portion 63 will be described in detail later.

The clipped image generated in step 14 is varied in the number of pixels, as necessary, by the image processing portion 6b, and is input to the image output circuit portion 12 and is displayed on the display device (step 35). Here, the image processing portion 6b performs enlargement processing and reduction processing on the clipped image to vary the number of pixels, with the result that the to-be-played-back image of the predetermined size is generated. In particular, it is desirable to perform this processing when the clip region is undefined, because the sizes of to-be-recorded images can be equal to each other.

In step 35, the to-be-played-back image is played back, and then whether or not an instruction to stop the playback is input from the user or whether or not the playback of all the images selected in step 21 is completed is checked (step 36). If the playback is not completed (step 36, no), that is, if the instruction to stop the playback is not input or if the playback of all the selected images is not completed, the process returns to step 7, where the clipping processing is performed on the subsequent input image.

On the other hand, if the playback is completed (step 36, yes), then whether or not the operation of the image sensing device 1a is completed is checked (step 17). If the operation of the image sensing device 1a is not completed (step 17, no), the process returns to step 21, where a screen for selecting the to-be-played-back image is displayed. On the other hand, if the operation of the image sensing device 1a is completed (step 17, yes), the operation is completed.

<<Degree of Relationship>>

The above-described method of calculating the degree of relationship will now be discussed by way of example using examples (parameters for use in calculation) and with reference to the relevant drawings.

A First Example

In this example, the degree of relationship is set based on the distance R1 between the main subject and the sub-subject. For example, the distance R1 may be calculated with a rectangular face-detection frame that is set by performing the face-detection processing described previously.

Figure 7:
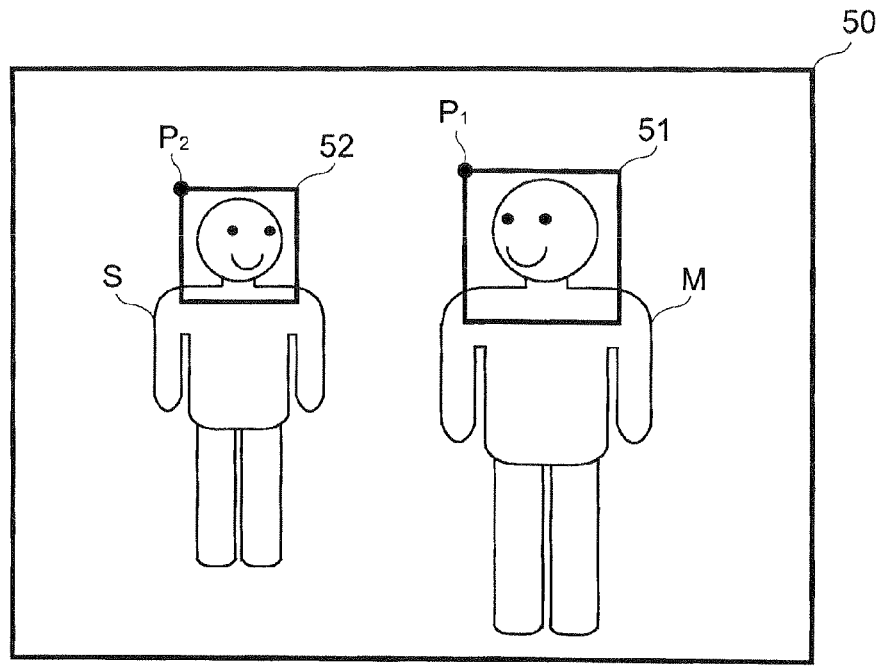
FIG. 7 is a schematic diagram of an input image showing a first example of a method of calculating the degree of relationship.

An example of the method of calculating the distance R1 will be described with reference to FIG. 7. FIG. 7 is a schematic diagram of an input image showing the first example of the method of calculating the degree of relationship. FIG. 7 shows a case where a main subject M and a sub-subject S are included in an input image 50. In the main subject M, the coordinates of the upper left vertex $P_1$ of a face-detection frame 51 are defined as $(x_1, y_1)$; in the sub-subject S, the coordinates of the upper left vertex $P_2$ of a face-detection frame 52 are defined as $(x_2, y_2)$. It is assumed that $x_1$ and $x_2$ represent a coordinate in a horizontal direction (a left and right direction in the figure), and that $y_1$ and $y_2$ represent a coordinate in a vertical direction (an upward and downward direction in the figure).

In this example, the distance R1 between the main subject M and the sub-subject S is expressed by equation (1) below.

$$R1=\sqrt{(x_1-x_2)^2+(y_1-y_2)^2} \quad (1)$$

As the distance R1 between the main subject M and the sub-subject S calculated as described above is shorter, the main subject M is located closer to the sub-subject S. Thus, the relationship between the main subject M and the sub-subject S is considered to be strong. Hence, as the distance R1 is shorter, the degree of relationship is set higher.

Although equation (1) above expresses a two-dimensional distance on the plane of the input image 50, the distance R1 between the main subject M and the sub-subject S can be expressed by a three-dimensional distance using coordinates in the depth direction. Equation (1a) below is obtained by calculating the distance R1 between the main subject M and the sub-subject S as a three-dimensional distance. It is assumed that the coordinate in the depth direction of the main subject M is represented by $z_1$ and that the coordinate in the depth direction of the sub-subject S is represented by $z_2$.

$$R1=\sqrt{(x_1-x_2)^2+(y_1-y_2)^2+(z_1-z_2)^2} \quad (1a)$$

The coordinates $z_1$ and $z_2$ in the depth direction can be calculated by utilizing, for example, the size of a face. In the case shown in FIG. 7, the main subject M having a relatively large face in the input image 50 is located closer and the sub-subject S having a relatively small face is located farther. In particular, the coordinates $z_1$ and $z_2$ in the depth direction may be calculated based on the sizes of the face-detection frames 51 and 52, respectively; by comparing the sizes of the face-detection frames 51 and 52, $(z_1-z_2)$ may be calculated.

It is also possible to utilize the result of autofocus (AF) to calculate the coordinates $z_1$ and $z_2$ in the depth direction. For example, the focal distance from the image sensing device 1 or 1a to each of the main subject M and the sub-subject S is utilized, and thus the coordinates $z_1$ and $z_2$ in the depth direction may be calculated. The focal distance can be calculated as follows: for example, an AF evaluation value obtained by totaling the high-frequency components in predetermined regions in an image input to the image processing portion 6 or 6a is calculated, and a focal distance in each of regions to which the main subject M and the sub-subject S belong is determined when the AF evaluation value is the largest.

A Second Example

In this example, the degree of relationship is set based on a face-to-face degree R2 that indicates the correlation between the orientations of the faces of the main subject and the sub-subject. For example, by using both the position of the rectangular face-detection frame that is set by performing the above-described face-detection processing and the orientation of the face that is obtained by performing the face-detection processing, the face-to-face degree R2 may be calculated. When the orientations of the faces of the main subject and the sub-subject are detected by the face-detection processing, for example, samples of faces pointing in different directions are used, and thus the matching may be performed.

Figure 8:
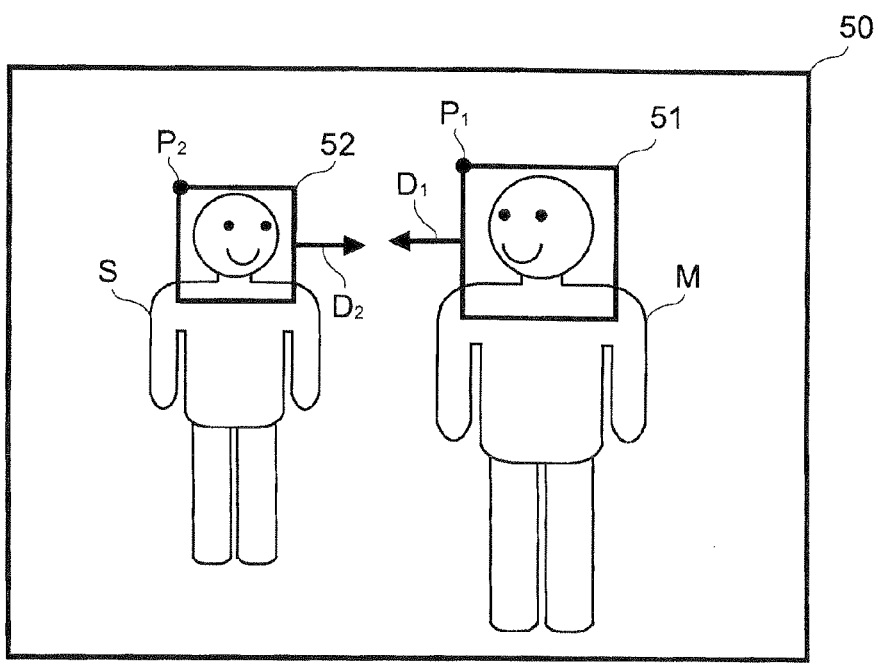
FIG. 8 is a schematic diagram of an input image showing a second example of the method of calculating the degree of relationship.

An example of the method of calculating the face-to-face degree R2 will be described with reference to FIG. 8. FIG. 8 is a schematic diagram of an input image showing a second example of the method of calculating the degree of relationship. The input image 50 shown in FIG. 8 is similar to that shown in FIG. 7. Thus, in FIG. 8, the same parts as in FIG. 7 are identified with common symbols, and their detailed description will not be repeated.

In FIG. 8, let the orientation of the face of the main subject M be $D_1$ and the orientation of the face of the sub-subject S be $D_2$. It is assumed that $D_1$ $(dx_1, dy_1, dz_1)$ and $D_2$ $(dx_2, dy_2, dz_2)$ are vectors and that they represent three-dimensional directions where the horizontal components are denoted by $dx_1$ and $dx_2$, the vertical components are denoted by $dy_1$ and $dy_2$ and the depth components are denoted by $dz_1$ and $dz_2$.

Here, when a direction (vector) $V_1$ from the main subject M to the sub-subject S is represented by the positions $P_1$ and $P_2$ of the face-detection frames 51 and 52, $V_1=P_2-P_1$. Likewise, a direction $V_2$ from the sub-subject S to the main subject M is given by $V_2=P_1-P_2$. Thus, the angle $T_1$ (rad) formed by the orientation $D_1$ of the face of the main subject M and the direction $V_1$ from the main subject M to the sub-subject S is given by equation (2a) below. Likewise, the angle $T_2$ formed by the orientation $D_2$ of the face of the sub-subject S and the direction $V_2$ from the sub-subject S to the main subject M is given by equation (2b) below, where ($0 \leq T_1 \leq \pi$) and ($0 \leq T_2 \leq \pi$). In equation (2a) and equation (2b) below, $V_1 \cdot D_1$ and $V_2 \cdot D_2$ represent an inner product. If $P_1=P_2$, it is assumed that $T_1=T_2=0$.

$$T_1 = \cos^{-1}\left(\frac{V_1 \cdot D_1}{|V_1||D_1|}\right) \quad (2a)$$

$$T_2 = \cos^{-1}\left(\frac{V_2 \cdot D_2}{|V_2||D_2|}\right) \quad (2b)$$

By the use of the angles $T_1$ and $T_2$ in equations (2a) and (2b) above, as shown in equation (2) below, the face-to-face degree R2 of the main subject M and the sub-subject S is calculated. When the main subject M and the sub-subject S face each other (that is, $T_1$ and $T_2$ are decreased), the face-to-face degree R2 approaches one; when they face away from each other (that is, $T_1$ and $T_2$ are increased), the face-to-face degree R2 approaches zero.

$$R2 = 1 - \frac{T_1 + T_2}{2\pi} \quad (2)$$

As the face-to-face degree R2 calculated as described above is higher (approaches one), the main subject M and the sub-subject S face each other more perfectly, and thus the relationship between the main subject M and the sub-subject S is considered to be stronger. Hence, as the face-to-face degree R2 is higher, the degree of relationship is set higher.

Although the above-described face-to-face degree R2 is three-dimensionally calculated with the components in the depth direction, it may be two-dimensionally calculated without the use of the components in the depth direction.

A Third Example

In this example, the degree of relationship is set with the degree of sound relationship R3 that indicates whether or not a sound signal obtained by the collecting of sound by the sound collector 5 is present. For example, the subject detection portion 61 shown in FIG. 2 is configured such that the subject detection portion 61 can acquire a sound signal, and information representing whether or not the sound signal is present may be included in the subject information.

Specifically, for example, when, irrespective of the main subject or the sub-subject, a sound signal of a predetermined level or more is obtained, the degree of sound relationship R3 is assumed to be one. When a sound signal of a predetermined level or more is not obtained, the degree of sound relationship R3 is assumed to be zero.

As the degree of sound relationship R3 calculated as described above is higher (approaches one), it is more likely that the main subject M and the sub-subject S produce sound to communicate with each other (for example, talk with each other), and thus the relationship between the main subject M and the sub-subject S is considered to be stronger. Hence, as the degree of sound relationship R3 is higher, the degree of relationship is set higher.

Based on a direction in which a sound to be collected by the sound collector 5 comes, the value of the degree of sound relationship R3 may be determined. The incoming direction of the sound can be identified by using, as the sound collector 5, for example, a microphone array having a plurality of microphones and comparing sound signals obtained by the collecting of sound by the microphones (for example, comparing phase displacements or time displacements). For example, when sounds coming from the direction of the main subject and the sub-subject are collected, the value of the degree of sound relationship R3 may be increased. In this way, it is possible to accurately determine whether or not the collected sounds are the sounds emitted by the main subject and the sub-subject.

A Fourth Example

In this example, the degree of relationship is set based on the degree of face similarity R4 that indicates similarity of face between the main subject and the sub-subject. For example, by performing the face-recognition processing described previously, the degree of face similarity R4 between the main subject and the sub-subject may be calculated.

Specifically, for example, the similarity of the face between the main subject and the sub-subject is determined by a score received when the face-recognition processing is performed on the sub-subject with the sample of a face (the sample having the highest score in the face detection) that is most similar to that of the main subject. In particular, as the score received when the face recognition is performed on the sub-subject is higher, the main subject and the sub-subject can be determined to be more similar to each other. The degree of face similarity R4 is assumed to satisfy a formula "$0 \leq R4 \leq 1$."

It is possible to calculate the score, for example, by detecting, from the face of the main subject, various feature points of the face sample and totaling the detection results. Moreover, a weight is assigned to each of the feature points, and, when a given feature point is detected from the main subject or the sub-subject, a high score may be especially given.

As the degree of face similarity R4 calculated as described above is higher (approaches one), it is more likely that the main subject M and the sub-subject S are similar to each other and that they are therefore relatives, and thus the relationship between the main subject M and the sub-subject S is considered to be stronger. Hence, as the degree of face similarity R4 is higher, the degree of relationship is set higher.

A Fifth Example

In this example, the degree of relationship is set based on the degree of movement direction similarity R5 that indicates similarity of movement direction between the main subject and the sub-subject. For example, from variations in the positions of the main subject and the sub-subject detected from images that are sequentially input, their individual movement directions are calculated, with the result that the degree of movement direction similarity R5 may be calculated.

Figure 9:
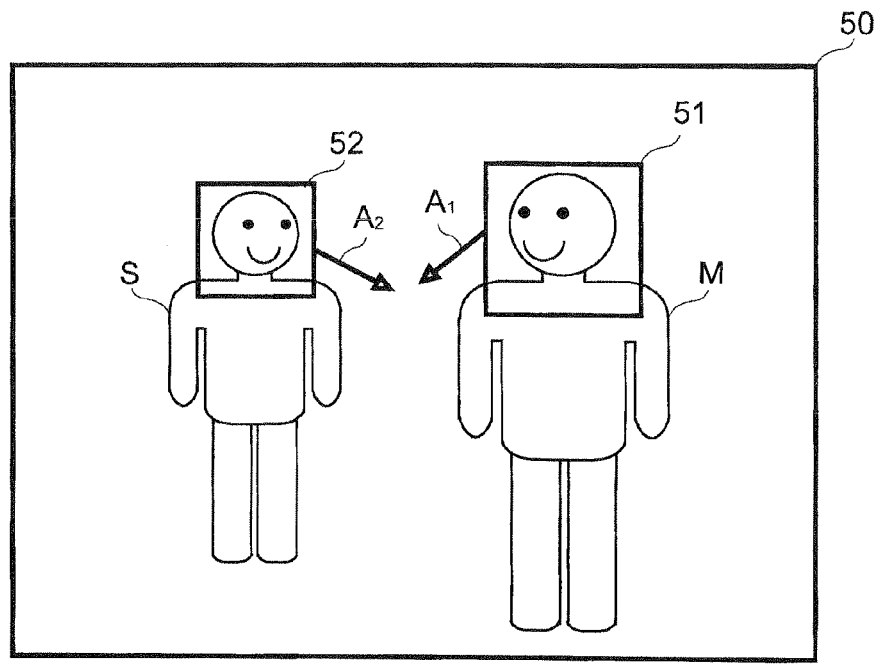
FIG. 9 is a schematic diagram of an input image showing a fifth example of the method of calculating the degree of relationship.

An example of the method of calculating the degree of movement direction similarity R5 will be described with reference to FIG. 9. FIG. 9 is a schematic diagram of an input image showing a fifth example of the method of calculating the degree of relationship. The input image 50 shown in FIG. 9 is similar to that shown in FIG. 7. Thus, in FIG. 9, the same parts as in FIG. 7 are identified with common symbols, and their detailed description will not be repeated.

In FIG. 9, the movement direction of the main subject M is represented by $A_1$ and the movement direction of the sub-subject S is represented by $A_2$. It is assumed that $A_1$ ($ax_1$, $ay_1$, $az_1$) and $A_2$ ($ax_2$, $ay_2$, $az_2$) are vectors and that they represent three-dimensional directions where the horizontal components are denoted by $ax_1$ and $ax_2$, the vertical components are denoted by $ay_1$ and $ay_2$ and the depth components are denoted by $az_1$ and $az_2$.

With the movement directions $A_1$ and $A_2$, as shown in equation (3) below, the degree of movement direction similarity R5 between the main subject M and the sub-subject S is calculated. When the movement directions of the main subject M and the sub-subject S coincide with each other, the degree of movement direction similarity R5 approaches one, whereas, when they are opposite to each other, the degree of movement direction similarity R5 approaches zero. When either of the main subject M and the sub-subject S does not move (in other words, when either the movement direction $A_1$ or the movement direction $A_2$ is zero), the degree of movement direction similarity R5 is assumed to be one, In equation (3) below, $A_1 \cdot A_2$ represent an inner product.

$$R5 = \frac{1 + \frac{A_1 \cdot A_2}{|A_1||A_2|}}{2} \quad (3)$$

As the degree of movement direction similarity R5 calculated as described above is higher (approaches one), the movement directions of the main subject M and the sub-subject S are more similar to each other, and thus the relationship between the main subject M and the sub-subject S is considered to be stronger. Hence, as the degree of movement direction similarity R5 is higher, the degree of relationship is set higher.

Although the degree of movement direction similarity R5 described above is three-dimensionally calculated with the components in the depth direction, it may be two-dimensionally calculated without the use of the components in the depth direction.

A Sixth Example

In this example, the degree of relationship is set based on the degree of color similarity R6 that indicates similarity of color between the main subject and the sub-subject. For example, based on the face-detection frame set by performing the above-described face-recognition processing, subject regions including the entire main subject and the entire sub-subject, respectively, are set, and the degree of color similarity R6 may be calculated with individual pieces of color information in the subject regions.

Figure 10:
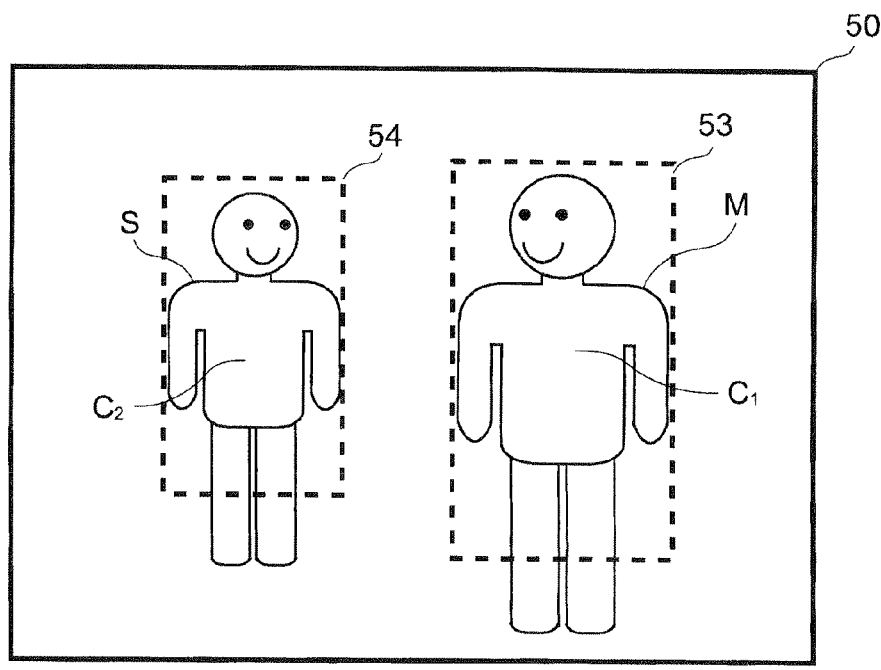
FIG. 10 is a schematic diagram of an input image showing a sixth example of the method of calculating the degree of relationship.

An example of the method of calculating the degree of color similarity R6 will be described with reference to FIG. 10. FIG. 10 is a schematic diagram of an input image showing a sixth example of the method of calculating the degree of relationship. The input image 50 shown in FIG. 10 is similar to that shown in FIG. 7. Thus, in FIG. 10, the same parts as in FIG. 7 are identified with common symbols, and their detailed description will not be repeated.

In FIG. 10, subject regions 53 and 54 are set such as by enlarging, for example, the face-detection frames 51 and 52 shown in FIG. 7 in a downward direction and a left and right direction by predetermined factors. Then, the pieces of color information in the subject regions 53 and 54 are acquired and compared, and thus the degree of color similarity R6 is calculated.

As the color information, for example, the average value of the pieces of color information in the subject regions 53 and 54 can be used. The pieces of color information can be represented by color vectors of RGB. Here, the color information of the subject region 53 for the main subject M is represented by $C_1$, and the color information of the subject region 54 for the sub-subject S is represented by $C_2$; they are represented by $C_1$ ($R_1$, $G_1$ $B_1$) and $C_2$ ($R_2$, $G_2$, $B_2$).

Here, with the pieces of the color information $C_1$ and $C_2$, as shown in equation (4) below, the degree of color similarity R6 between the main subject M and the sub-subject S is calculated. When the colors of the main subject M and the sub-subject S are similar to each other, the degree of color similarity R6 approaches one, whereas, when they are different from each other, the degree of color similarity R6 approaches zero. In equation (4) below, $C_1 \cdot C_2$ represent an inner product.

$$R6 = \frac{1 + \frac{C_1 \cdot C_2}{|C_1||C_2|}}{2} \quad (4)$$

As the degree of color similarity R6 calculated as described above is higher (approaches one), the colors of the main subject M and the sub-subject S are more similar to each other, and, for example, it is more likely that they wear the same clothes, hat or the like. Thus, the relationship between the main subject M and the sub-subject S is considered to be stronger. Hence, as the degree of color similarity R6 is higher, the degree of relationship is set higher.

Although the pieces of color information $C_1$ and $C_2$ are ones that use signals of RGB, they may be ones that use signals of YUV or may be ones that use signals of H (hue), S (saturation), B (brightness) and the like. Although the pieces of color information $C_1$ and $C_2$ are ones that are obtained by averaging the pieces of color information of the subject regions 53 and 54, they may be ones that are obtained by extracting part (for example, the most frequently appearing color) of the color information.

Unlike equation (4) above, the difference in color information between the main subject M and the sub-subject S may not be represented by the difference in angle between the color vectors. The difference in color information may be calculated with, for example, the difference between the squares of pixel values, the difference between the absolute values of pixel values or the like.

A Seventh Example

In this example, the degree of relationship is set based on the degree of specific subject existence R7 that indicates whether or not a sub-subject in an input image is recognized as a specific subject. For example, the face of a specific subject is previously recorded as a sample, and the face-recognition processing is performed, with the result that the degree of specific subject existence R7 may be calculated by determining whether or not the face of the sub-subject is recognized as the face of the specific subject.

Specifically, for example, the degree of specific subject existence R7 is set by a score obtained by performing, with the face sample of the specific subject, the face-recognition processing on the sub-subject. In particular, if the score is equal to or more than a predetermined value, the sub-subject is considered to be the specific subject, and the degree of specific subject existence R7 is set at one. On the other hand, if the score is less than the predetermined value, the sub-subject is considered not to be the specific subject, and the degree of specific subject existence R7 is set at zero.

As the degree of specific subject existence R7 calculated as described above is higher (approaches one), it is more likely that the specific subject which the user wishes to contain in an clipped image along with the main subject is included, and thus the relationship between the main subject and the sub-subject is considered to be stronger. Hence, as the degree of specific subject existence R7 is higher, the degree of relationship is set higher.

The value of the degree of specific subject existence R7 may be set according to the score obtained by performing, with the specific face sample, the face-recognition processing on the sub-subject. In particular, as the score is higher, the degree of specific subject existence R7 may be set higher. The degree of specific subject existence R7 is assumed to satisfy a formula "$0 \leq R7 \leq 1$."

An Eighth Example

In this example, the degree of relationship is set based on the degree of appearance R8 that indicates a rate at which the sub-subject appears. For example, based on a ratio between the number of images input sequentially to the clipping processing portion 60 and the number of input images including the sub-subject, the degree of appearance R8 may be calculated.

Specifically, for example, when this example is applied during the recording of images, the degree of appearance R8 is calculated by dividing, by the number of images input until the degree-of-relationship calculation portion 62 calculates the degree of relationship, the number of input images including the sub-subject among those input images. For example, when this example is applied during the playback of images, the degree of appearance R8 is calculated by dividing, by the number of all input images displayed (for example, the number of all pixels included in a moving image file), the number of input images including the sub-subject among those input images. The degree of appearance R8 set in this way is a value that satisfies a formula "$0 \leq R8 \leq 1$."

As the degree of appearance R8 calculated as described above is higher (approaches one), it is more likely that the sub-subject is included in the input image along with the main subject and thus the relationship between the main subject and the sub-subject is considered to be stronger. Hence, as the degree of appearance R8 is higher, the degree of relationship is set higher.

When the clipping processing is performed on playback, the degree of appearance R8 is determined by detecting the sub-subject during the recording of images, and the degree of appearance R8 may be recorded in the external memory 10 along with the images. Before the playback is started, the sub-subjects are detected from all the input images (for example, all images that are included in a moving image file), and the degree of appearance R8 may be calculated.

[Variations]

Although, in the first, second and fifth examples described above, the positions of the main subject and the sub-subject are indicated by the face-detection frames, the positions may be indicated by regions including the entire main subject and the entire sub-subject. For example, the subject region shown in the sixth example may be used. The positions of the main subject and the sub-subject may be indicated by using either a vertex other than the vertex in the upper left corner of the face-detection frame or the center point.

The above-described examples can be practiced in combination. Specifically, as shown in equation (5) below, a weight is assigned to each of the above-described parameter values R1 to R8, and the resulting values are summed, and then the degree of relationship Y may be calculated. W1 to W8 in equation (5) below respectively refer to weighting factors by which the parameter values R1 to R8 are multiplied. As the distance R1 is only shorter, the degree of relationship is higher, and thus the summing is performed by multiplying the inverse 1/R1 by the weighting factor W1.

$$Y = W1 \times \frac{1}{R1} + W2 \times R2 + W3 \times R3 + \quad (5)$$
$$W4 \times R4 + W5 \times R5 + W6 \times R6 + W7 \times R7 + W8 \times R8$$

Although, in equation (5) above, the degree of relationship Y is calculated with all the values R1 to R8 shown in the first to eighth examples, the use of any of the values may be avoided. In addition to these values, a value that indicates the strength of relationship between the main subject and the sub-subject may be added.

Specifying the degree of relationship Y with various values in this way allows the degree of relationship Y to be set as a value having multiple aspects. Thus, it is possible to accurately calculate the degree of relationship.

<Specific Examples of Clipping Processing>

Specific examples of clipping processing using the degree of relationship discussed above will now be described with the relevant drawings. In particular, a method of setting a clip region by the clip region setting portion 63 of FIG. 2 will be described.

Figure 11:
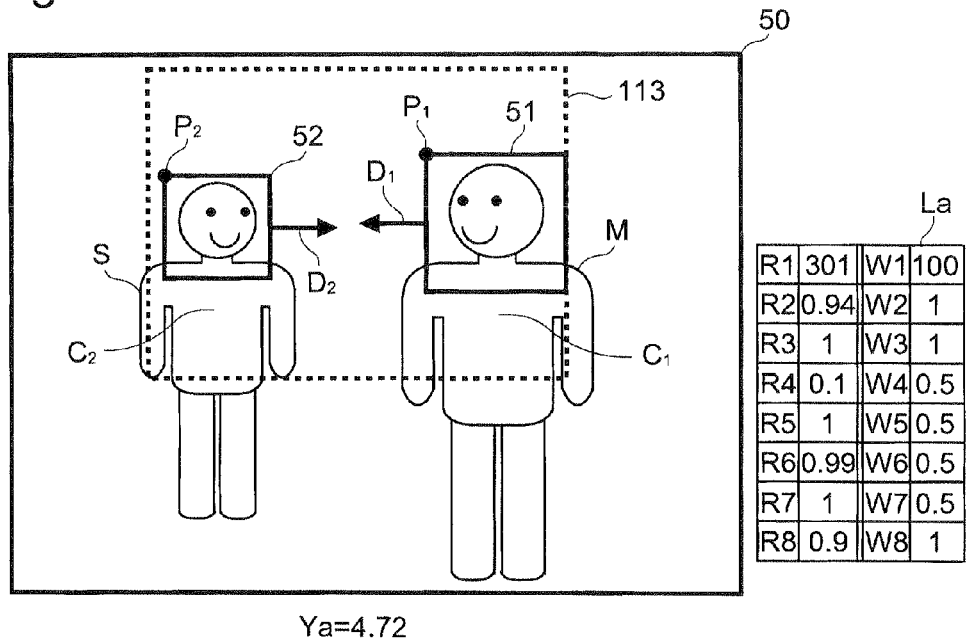
FIG. 11 is a schematic diagram of an input image showing an example of a method of setting a clip region.

FIG. 11 is a schematic diagram of an input image showing an example of the method of setting a clip region. The input image 50 shown in FIG. 11 is similar to that shown in FIG. 7. Thus, in FIG. 11, the same parts as in FIG. 7 are identified with common symbols, and their detailed description will not be repeated. FIG. 11 shows a case where the clipping processing is performed on playback.

In the example shown in FIG. 11, the input image (in other words, the image recorded in the external memory 10 of FIG. 1) is assumed to be 640×480 pixels in size. The to-be-played-back image (in other words, the image resulting from the size conversion performed in step 35 of FIG. 6) is also assumed to be 640×480 pixels in size. In the input image shown in FIG. 11, the coordinates of the upper left pixel are assumed to be (0, 0), and the coordinates of the lower right pixel are assumed to be (639, 479).

In the main subject M shown in FIG. 11, it is assumed that the size of the face-detection frame 51 is (240, 240), that the coordinates $P_1$ of the upper left vertex are (360, 80), that the orientation of the face $D_1$ is (10, 2) and that the color information $C_1$ is (150, 150, 50). In the sub-subject S, it is assumed that the size of the face-detection frame 52 is (180, 180), that the coordinates $P_2$ of the upper left vertex are (60, 100), that the orientation of the face $D_2$ is (10, 2) and that the color information $C_2$ is (150, 150, 50).

It is assumed that sound signals are input and that the main subject M and the sub-subject S do not move. It is also assumed that the face of the main subject M is slightly similar to that of the sub-subject S, and that the face of the sub-subject S is similar to the specific face sample recorded. The sub-subject S is assumed to be included in 90 input images out of 100 input images to be played back.

In this case, the parameter values R1 to R8 are those shown in Table La of FIG. 11. Specifically, R1=301, R2=0.94, R3=1, R4=0.1, R5=1, R6=0.99, R7=1 and R8=0.9. With respect to the weighting factors W1 to W8, it is assumed that W1=100, W2=1, W3=1, W4=0.5, W5=0.5, W6=0.5, W7=0.5 and W8=1. In this case, when the degree of relationship Ya is calculated according to equation (5) above, the degree of relationship Ya is 4.72.

The clip region setting portion 63 shown in FIG. 2 compares, for example, a predetermined threshold TH_Y (for example, 3.0) with the degree of relationship Ya to determine the method of setting the clip region. As shown in FIG. 11, when the degree of relationship Ya (=4.72) is equal to or more than the threshold TH_Y (=3.0), the clip region is set based on the positions of the main subject M and the sub-subject S in the input image. In particular, a clip region 113 including the main subject M and the sub-subject S is set.

For example, the clip region 113 is set such that the center of the clip region 113 coincides with the intermediate position (315, 195) between the centers (150, 190) and (480, 200) of the face-detection frames 51 and 52. The clip region 113 is set such that the aspect ratio of the clip region 113 is substantially equal to the aspect ratio (in this example, 640:480=4:3) of the to-be-played-back image and that the clip region 113 includes all the face-detection frames 51 and 52. Consequently, in the example shown in FIG. 11, a 570×428 pixel clip region 113 is set.

Since the clip region 113 is smaller than the to-be-played-back image, the enlargement processing described previously is performed. For example, interpolation processing is performed to increase the number of pixels, and thus a clipped image having 640×480 pixels is generated.

Figure 12:
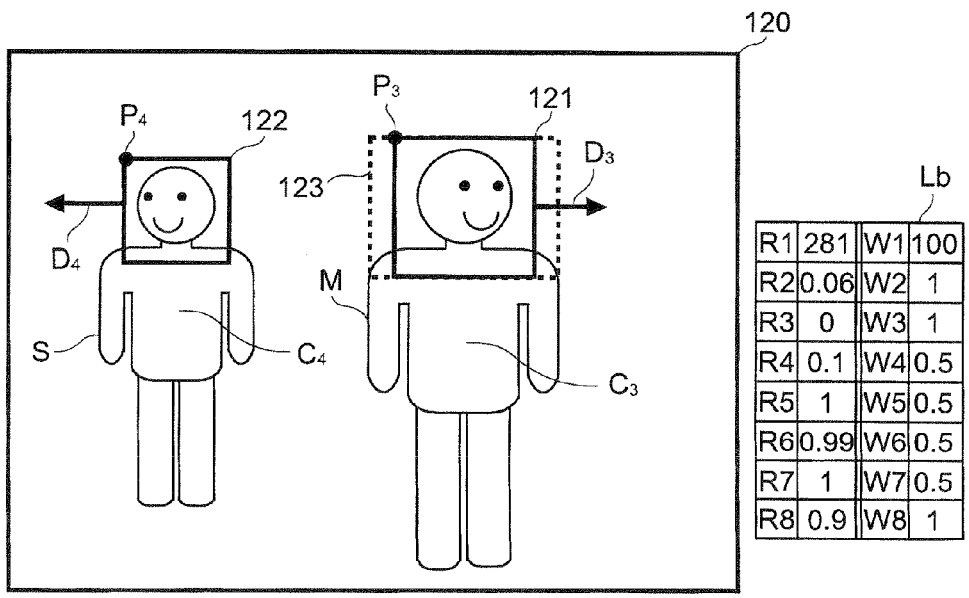
FIG. 12 is a schematic diagram of an input image showing another example of the method of setting a clip region.

In FIG. 12, another example of the method of setting a clip region is shown; FIG. 12 is a schematic diagram of an input image showing another example of the method of setting a clip region. An input image 120 shown in FIG. 12 is similar to the input image 50 shown in FIG. 7 except that the positions, the orientations and the like of the main subject M and the sub-subject S are different from each other. In FIG. 12, the same parts as in FIG. 7 are identified with common symbols, and their detailed description will not be repeated. FIG. 12 shows a case where the clip region is set under the same conditions as the example shown in FIG. 11 (the clipping processing is perfo lied on playback; the input image and the to-be-played-back image each are 640×480 pixels in size).

In the main subject M shown in FIG. 12, it is assumed that the size of the face-detection frame 121 is (240, 240), that the coordinates $P_3$ of the upper left vertex are (300, 80), that the orientation of the face $D_3$ is (10, 2) and that the color information $C_3$ is (150, 150, 50). In the sub-subject S, it is assumed that the size of the face-detection frame 122 is (180, 180), that the coordinates $P_4$ of the upper left vertex are (20, 100), that the orientation of the face $D_4$ is (10, 2) and that the color information $C_4$ is (150, 150, 50).

It is assumed that sound signals are not input and that the main subject M and the sub-subject S do not move. It is also assumed that the face of the main subject M is slightly similar to that of sub-subject S, and that the face of the sub-subject S is similar to the specific face sample recorded. The sub-subject S is assumed to be included in 90 input images out of 100 input images to be played back.

In this case, the parameter values R1 to R8 are those shown in Table Lb of FIG. 12. Specifically, R1=281, R2=0.06, R3=0, R4=0.1, R5=1, R6=0.99, R7=1 and R8=0.9. With respect to the weighting factors W1 to W8, it is assumed that W1=100, W2=1, W3=1, W4=0.5, W5=0.5, W6=0.5, W7=0.5 and W8=1. In this case, when the degree of relationship is calculated according to equation (5) above, the degree of relationship Yb is 2.86.

As described above, the clip region setting portion 63 shown in FIG. 2 compares, for example, the predetermined threshold TH_Y (for example, 3.0) with the degree of relationship Yb to determine the method of setting the clip region. As shown in FIG. 12, when the degree of relationship Yb (=2.86) is less than the threshold TH_Y (=3.0), the clip region is set based on the position of the main subject M in the input image. In particular, the clip region 123 is set such that the main subject M is located substantially at the center.

For example, the clip region 123 is set such that the center of the clip region 123 coincides with the center (that is, (420, 200)) of the face-detection frame 121. The clip region 123 is set such that the aspect ratio of the clip region 123 is substantially equal to the aspect ratio (in this example, 640:480=4:3) of an image to be input and that the clip region 123 includes the entire face-detection frame 121. Consequently, in the example shown in FIG. 12, a 320×240 pixel clip region 123 is set.

Since the clip region 123 is smaller than the image to be output, the enlargement processing described above is performed. For example, interpolation processing is performed to increase the number of pixels, and thus a clipped image having 640×480 pixels is generated.

When the clip region is set and the clipping processing is performed as described above, it is possible to change the configuration of the clipped image according to the strength of relationship between the main subject and the sub-subject. Especially when the relationship between the main subject and the sub-subject is strong (in other words, when the relationship is determined by the degree-of-relationship calculation portion 62 to be close), it is possible to obtain a clipped image including the main subject and the sub-subject. Thus, it is possible to obtain a clipped image in which the behavior of the main subject is clear.

On the other hand, when the relationship between the main subject and the sub-subject is weak (in other words, when the relationship is determined by the degree-of-relationship calculation portion 62 to be subtle), it is possible to obtain a clipped image in which the main subject is located substantially at its center. Thus, it is possible to prevent an unnecessary sub-subject from being included in the clipped image, with the result that the clipped image in which emphasis is placed on the main subject can be obtained.

Although the above description deals with the specific example where one sub-subject is included in the input image, a plurality of sub-subjects may be included in the input image. When a plurality of sub-subjects are included, it is possible to calculate the degrees of relationship between the sub-subjects and the main subject and to set whether or not each of the sub-subjects is included in the clipped image.

Moreover, a weight is assigned to each of the center positions of a plurality of sub-subjects included in the clipped image according to the degree of relationship between the main subject and each of the sub-subjects, and the average of the resulting positions may be considered to be the position of the center of the sub-subjects. Then, the clip region may be set such that the intermediate position between the center position of the main subject and the position of the center of the sub-subjects is the center position.

Although the above description deals with a case where the positions of the main subject and the sub-subject are represented by the face-detection frames, they may be represented by the subject regions shown in FIG. 10.

Although, when the enlargement processing is performed on the clipped image as described above, for example, the interpolation processing is performed to increase the number of pixels in the clipped image that is input, in addition to the interpolation processing (or instead of it) super-resolution processing may be performed.

When the super-resolution processing is performed, it is possible to enhance the quality of an image (an image to be recorded or an image to be played back) obtained by performing the enlargement processing. The following description discusses a case where a MAP (maximum a posterior) method that is one type of super-resolution processing is used; such a case will be described with reference to the relevant drawings. FIGS. 13A to 13D and FIGS. 14A to 14D are diagrams showing an outline of the super-resolution processing.

In the following description, for ease of description, a plurality of pixels aligned in one direction of the clipped image are considered. A case will be described as an example in which two clipped images are combined together and thus the super-resolution processing is performed, and in which pixel values to be combined are brightness values.

Figure 13A:
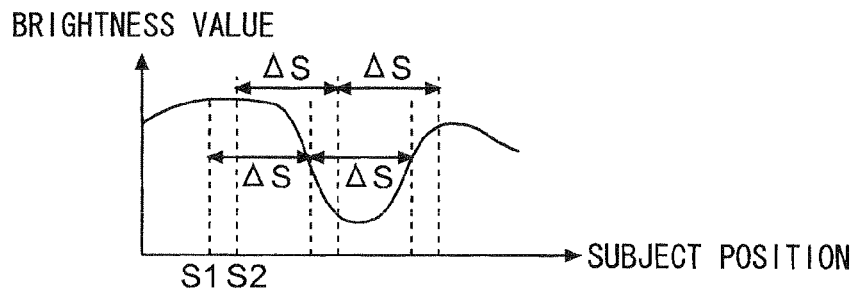
FIG. 13A is a graph showing the brightness distribution of a subject to be captured.
Figure 13B:
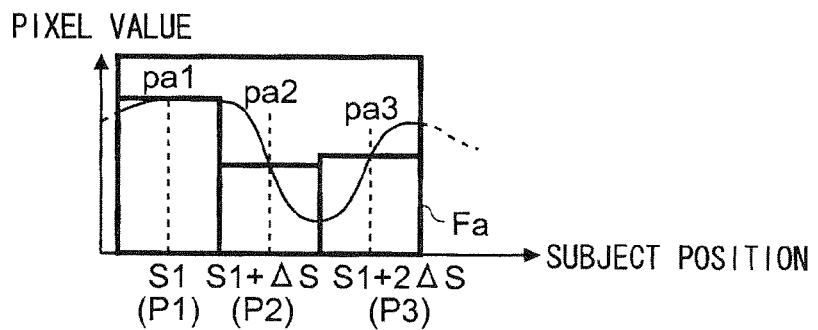
FIG. 13B is a clipped image when the subject shown in FIG. 13A is captured.
Figure 13C:
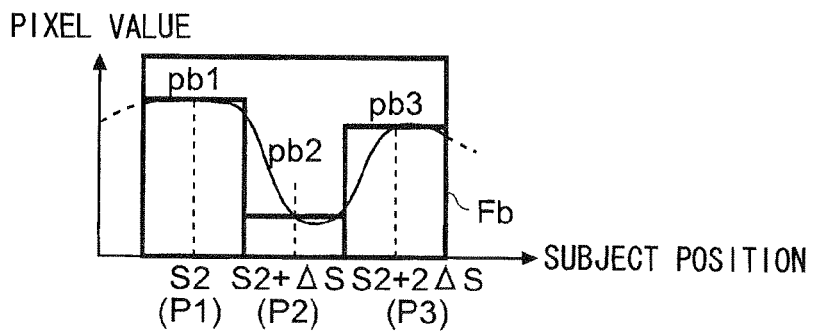
FIG. 13C is a clipped image when the subject shown in FIG. 13A is captured.
Figure 13D:
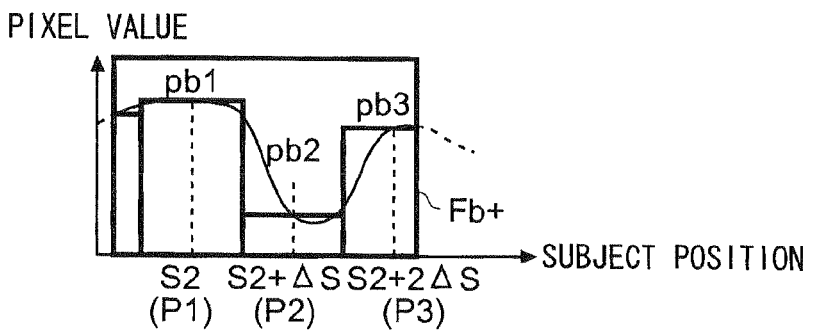
FIG. 13D is an image obtained by shifting the clipped image shown in FIG. 13C by a predetermined amount.

FIG. 13A shows the brightness distribution of a subject to be captured. FIGS. 13B and 13C show the brightness distribution of clipped images obtained by capturing the subject shown in FIG. 13A. FIG. 13D shows an image obtained by shifting the clipped image shown in FIG. 13C by a predetermined amount. The clipped image shown in FIG. 13B (hereinafter referred to as an actual low-resolution image Fa) and the clipped image shown in FIG. 13C (hereinafter referred to as an actual low-resolution image Fb) are captured at different times.

As shown in FIG. 13B, let S1, S1+$\Delta$S and S1+2$\Delta$S be the positions of sample points in the actual low-resolution image Fa obtained by capturing, at a time point T1, the subject having the brightness distribution shown in FIG. 13A. As shown in FIG. 13C, let S2, S2+$\Delta$S, and S2+2$\Delta$S be the positions of sample points in the actual low-resolution image Fb obtained by capturing the subject at a time point T2 (T1≠T2). Here, it is assumed that the sample point S1 in the actual low-resolution image Fa and the sample point S2 in the actual low-resolution image Fb are displaced from each other due to camera shake or the like. That is, the pixel position is displaced only by (S1−S2).

In the actual low-resolution image Fa shown in FIG. 13B, let the brightness values obtained at the sample points S1, S1+$\Delta$S and S1+2$\Delta$S be pixel values pa1, pa2 and pa3 at pixels P1, P2 and P3. Likewise, in the actual low-resolution image Fb shown in FIG. 13C, let the brightness values obtained at the sample points S2, S2+$\Delta$S and S2+2$\Delta$S be pixel values pb1, pb2 and pb3 at the pixels P1, P2 and P3.

Here, when the actual low-resolution image Fb is displayed relative to the pixels P1, P2 and P3 (the image of interest) in the actual low-resolution image Fa (specifically, when the displacement of the actual low-resolution image Fb is corrected only by the amount of movement (S1−S2) relative to the actual low-resolution image Fa), an actual low-resolution image Fb+ whose positional displacement has been corrected is as shown in FIG. 13D.

Figure 14A:
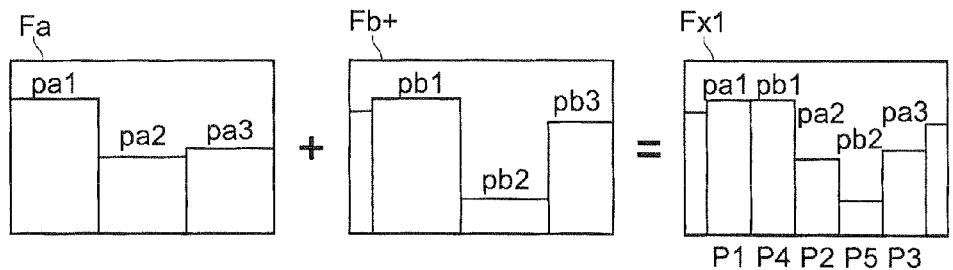
FIG. 14A is a diagram showing a method of estimating a high-resolution image from an actual low-resolution image.

FIGS. 14A to 14D show a method for generating a high-resolution image by combining together the actual low-resolution image Fa and the actual low-resolution image Fb+. First, as shown in FIG. 14A, the actual low-resolution image Fa and the actual low-resolution image Fb+ are combined together, and thus a high-resolution image Fx1 is estimated. For ease of description, for example, it is assumed that the resolution is doubled in one direction. Specifically, the pixels of the high-resolution image Fx1 are assumed to include the pixels P1, P2 and P3 of the actual low-resolution images Fa and Fb+, the pixel P4 located halfway between the pixels P1 and P2 and the pixel P5 located halfway between the pixels P2 and P3.

As a pixel value at the pixel P4 in the actual low-resolution image Fa, the pixel value pb1 is selected because the distance from the pixel position of the pixel P1 to the pixel position of the pixel P4 in the actual low-resolution image Fb+ is shorter than the distances from the pixel positions (the center positions of the pixels) of the pixels P1 and P2 to the pixel position of the pixel P4 in the actual low-resolution image Fa. Likewise, as a pixel value at the pixel P5, the pixel value pb2 is selected because the distance from the pixel position of the pixel P2 to the pixel position of the pixel P5 in the actual low-resolution image Fb+ is shorter than the distances from the pixel positions of the pixels P2 and P3 to the pixel position of the pixel P5 in the actual low-resolution image Fa.

Figure 14B:
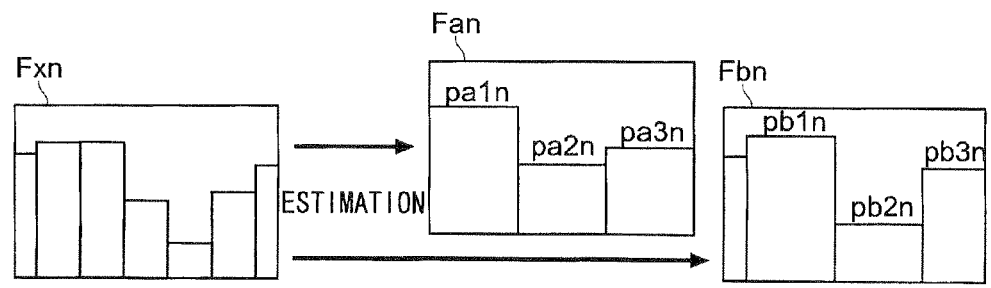
FIG. 14B is a diagram showing a method of estimating a low-resolution estimation image from the high-resolution image.

Thereafter, as shown in FIG. 14B, the high-resolution image Fx1 thus obtained is subjected to calculation using a conversion formula including, as parameters, the amount of down sampling, the amount of blur and the amount of displacement (corresponding to the amount of movement), and thus low-resolution estimation images Fa1 and Fb1, that is, estimated images corresponding to the actual low-resolution images Fa and Fb, respectively, are generated. FIG. 14B shows low-resolution estimation images Fan and Fbn generated from a high-resolution image Fxn that is estimated through the processing performed for the nth time.

Figure 14C:
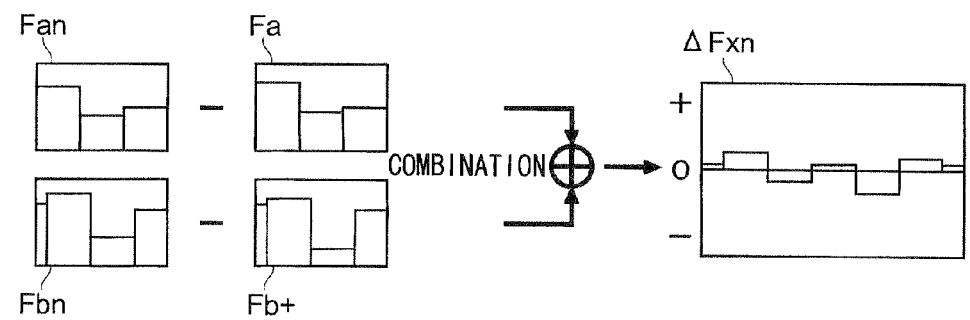
FIG. 14C is a diagram showing a method of generating a difference image from the low-resolution estimation image and the actual low-resolution image.

For example, when n=1, based on the high-resolution image Fx1 shown in FIG. 14A, the pixel values at the sample points S1, S1+ΔS and S1+2ΔS are estimated, and the low-resolution estimation image Fa1 is generated that has the acquired pixel values pa11 to pa31 as the pixel values of the pixels P1 to P3. Likewise, based on the high-resolution image Fx1, the pixel values at the sample points S2, S2+ΔS and S2+2ΔS are estimated, and the low-resolution estimation image Fb1 is generated that has the acquired pixel values pb11 to pb31 as the pixel values of the pixels P1 to P3. Then, as shown in FIG. 14C, the differences between each of the low-resolution estimation images Fa1 and Fb1 and the corresponding one of the actual low-resolution images Fa and Fb are determined, and these differences are combined together to acquire a differential image ΔFx1 with respect to the high-resolution image Fx1. FIG. 14C shows a differential image ΔFxn with respect to the high-resolution image Fxn acquired through the processing performed for the nth time.

For example, a differential image ΔFa1 has, as the pixel values of the pixels P1 to P3, the difference values (pa11−pa1), (pa21−pa2) and (pa31−pa3), and a differential image ΔFb1 has, as the pixel values of the pixels P1 to P3, the difference values (pb11−pb1), (pb21−pb2) and (pb31−pb3). Then, by combining together the pixel values of the differential images ΔFa1 and ΔFb1, the difference values of the pixels P1 to P5 are calculated, with the result that the differential image ΔFx1 with respect to the high-resolution image Fx1 is acquired. When the differential image ΔFx1 is acquired by combining together the pixel values of the differential images ΔFa1 and ΔFb1, for example, if an ML (maximum likelihood) method or a MAP method is used, squared errors are used as an evaluation function. Specifically, a value obtained by adding, between frames, squared pixel values of the differential images ΔFa1 and ΔFb1 is assumed to be an evaluation function. Thus, the gradient given as the differential value of that evaluation function has values twice as great as the pixel values of the differential images ΔFa1 and ΔFb1. Accordingly, the differential image ΔFx1 with respect to the high-resolution image Fx1 is calculated through resolution enhancement using values twice as great as the pixel values of each of the differential images ΔFa1 and ΔFb1.

Figure 14D:
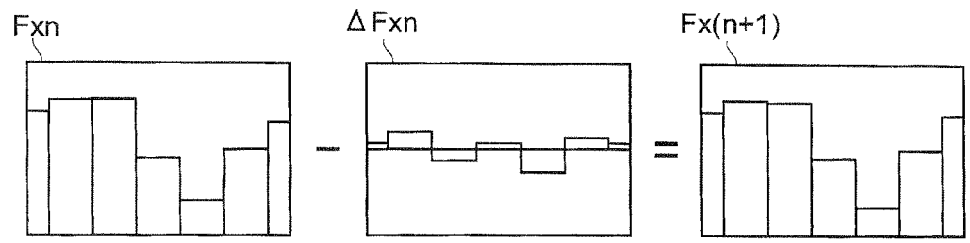
FIG. 14D is a diagram showing a method of reconfiguring a high-resolution image from the high-resolution image and the difference image.

Thereafter, as shown in FIG. 14D, the pixel values (difference values) of the pixels P1 to P5 in the obtained differential image ΔFx1 are subtracted from the pixel values of the pixels P1 to P5 in the high-resolution image Fx1, with the result that a high-resolution image Fx2 is reconstructed that has pixel values close to the subject having the brightness distribution shown in FIG. 13A. FIG. 14D shows a high-resolution image Fx (n+1) acquired through the processing performed for the nth time.

Then, a series of processing steps described above is repeated such that the pixel values of differential image ΔFxn obtained are decreased and thus the pixel values of the high-resolution image Fxn converge to pixel values close to the subject having the brightness distribution shown in FIG. 13A. When the pixel values (difference values) of the differential image ΔFxn are lower than a predetermined value, or when the pixel values (difference values) of the differential image ΔFxn converges, the high-resolution image Fxn obtained by the previous round of the processing (performed for the (n−1) th time) is considered to be an image resulting from the super-resolution processing (an image to be recorded or an image to be played back).

Figure 15:
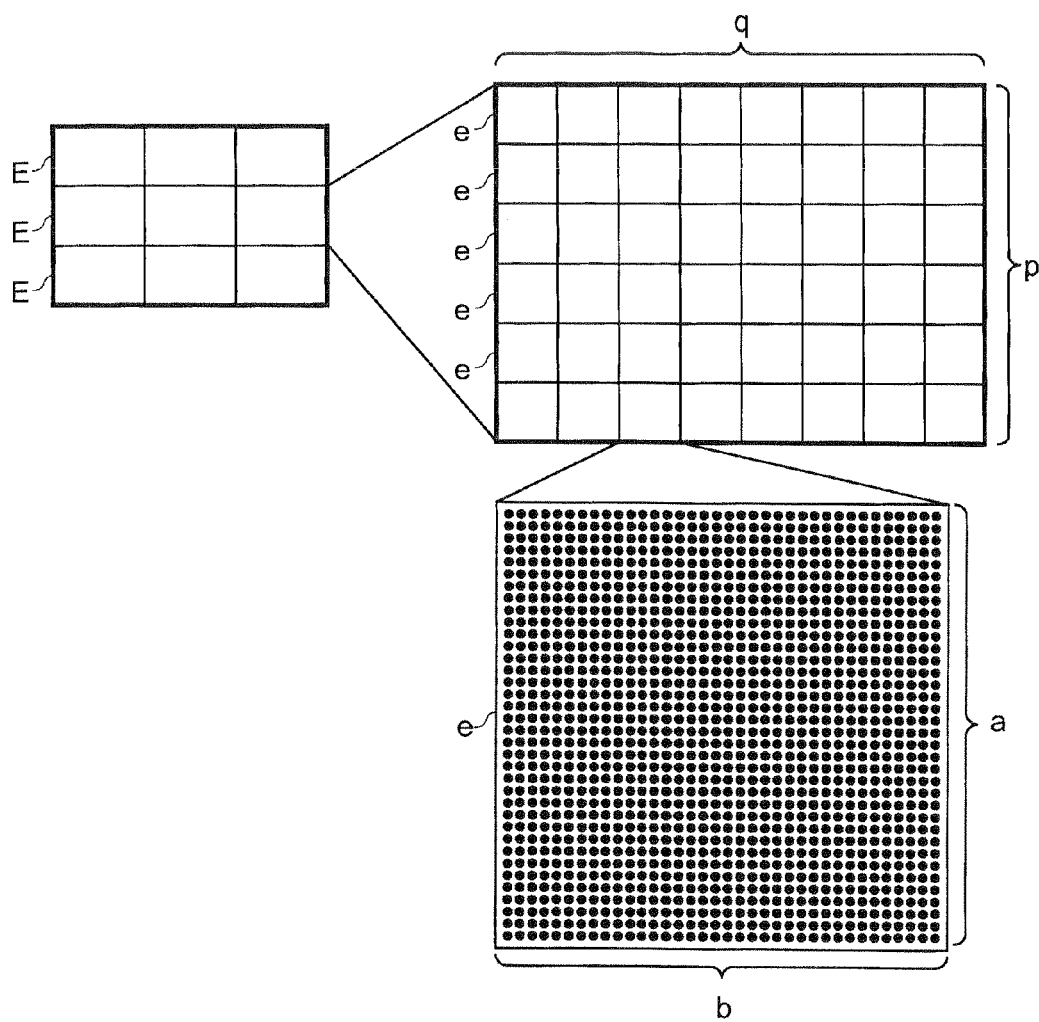
FIG. 15 is a schematic diagram showing how an image is divided into regions in representative point matching.
Figure 16A:
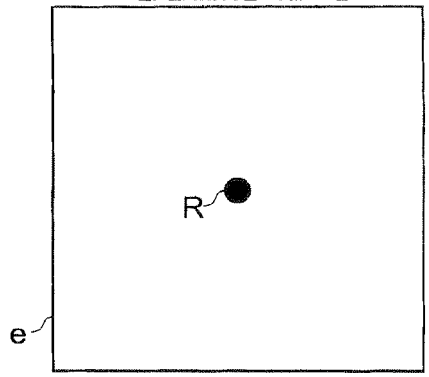
FIG. 16A is a schematic diagram of a reference image showing the representative point matching.
Figure 16B:
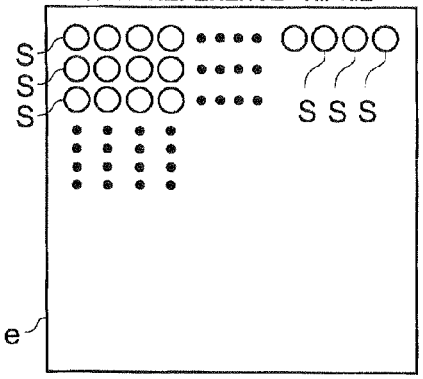
FIG. 16B is a schematic diagram of a non-reference image showing the representative point matching

In the above processing, in order to determine the amount of movement (the amount of displacement), it is possible to perform, for example, representative point matching and single-pixel movement amount detection as described below. First, the representative point matching, and then the single-pixel movement amount detection will be described with reference to the relevant drawings. FIGS. 15 and 16A and 16B are diagrams showing the representative point matching. FIG. 15 is a schematic diagram showing how an image is divided into regions, and FIGS. 16A and 16B are schematic diagrams showing a reference image and a non-reference image.

In the representative point matching, for example, an image serving as a reference (reference image) and an image compared with the reference image to detect movement (non-reference image) are each divided into regions as shown in FIG. 15. For example, an a×b pixel group (for example, a 36×36 pixel group) is divided as one small region "e", and then a p×q region portion (for example, 6×8 region portion) of such a small region "e" is divided as one detection region E. Moreover, as shown in FIG. 16A, one of the a×b pixels composing the small region "e" is set at the representative point Q. On the other hand, as shown in FIG. 16B, a plurality of pixels among the a×b pixels composing the small region "e" are set at sampling points U (for example, all the a×b pixels may be set at the sampling points U).

When the small region "e" and the detection region E are set as described above, with respect to the small region "e" serving as the same position in the reference and non-reference images, the difference between the pixel value at each sampling point U in the non-reference image and the pixel value at the representative point Q in the reference image is determined as the correlation value at that sampling point U. Then, for each detection region E, the correlation values at the sampling points U where positions relative to the representative point R coincide with each other between the small regions "e" are added up for all the small regions "e" composing the detection region E, with the result that the cumulative correlation value at each sampling point U is acquired. In this way, for each detection region E, the correlation values at p×q sampling points U where positions relative to the representative point Q coincide with each other are added up, with the result that as many cumulative correlation values as there are sampling points are obtained (for example, when all the a×b pixels are set at the sampling points U, a×b cumulative correlation values are obtained).

After, for each detection region E, the cumulative correlation values at the individual sampling points U have been determined, then, for each detection region E, the sampling point U considered to have the highest correlation with the representative point Q (i.e., the sampling point U with the lowest cumulative correlation value) is detected. Then, for each detection region E, the movement amounts of the sampling point U with the lowest cumulative correlation value and of the representative point Q are determined based on their respective pixel positions. Thereafter, the movement amounts determined for the individual detection regions E are averaged, and thus the average value is detected as the movement amount of each of pixels between the reference and non-reference images.

Figure 17A:
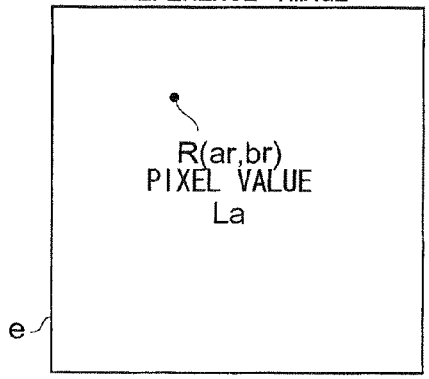
FIG. 17A is a schematic diagram of a reference image showing single-pixel movement amount detection.
Figure 17B:
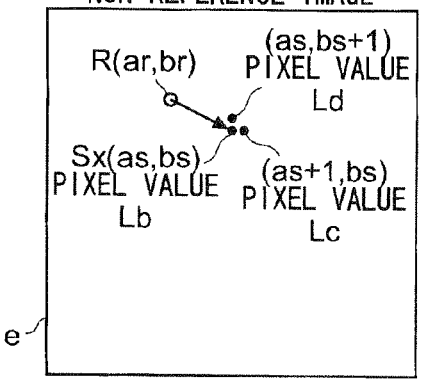
FIG. 17B is a schematic diagram of a non-reference image showing the single-pixel movement amount detection.

The single-pixel movement amount detection will now be described with reference to the relevant drawings. FIGS. 17A and 17B are schematic diagrams of a reference image and a non-reference image showing the single-pixel movement amount detection, and FIGS. 18A and 18B are graphs showing the relationship between the pixels values of the representative points and the sampling points during the single-pixel movement amount detection.

After the movement amount of each pixel is detected with, for example, the representative point matching as described above, the movement amount within a single pixel can further be detected with the method described above. For example, for each small regions "e", with the relationship between the pixel value of the pixel at the representative point Q in the reference image and the pixel values of the pixels at and around a sampling point Ux having a high correlation with the representative point Q, it is possible to detect the movement amount within a single pixel.

As shown in FIGS. 17A and 17B, for each small region "e", with the relationship between a pixel value La at the representative point Q serving as a pixel position (ar, br) in the reference image, a pixel value Lb at a sample point Ux serving as a pixel position (as, bs) in the non-reference image, a pixel value Lc at a pixel position (as+1, bs) adjacent to the sample point Ux in a horizontal direction and a pixel value Ld at a pixel position (as, bs+1) adjacent to the sample point Ux in a vertical direction, the movement amount within a single pixel is detected. Here, by the representative point matching, the movement amount of each pixel from the reference image to the non-reference image is determined as a value expressed by the vector quantity (as−ar, bs−br).

Figure 18A:
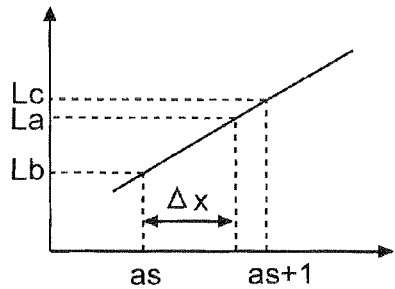
FIG. 18A is a graph showing a horizontal relationship between the pixels values of representative points and sampling points when the single-pixel movement amount detection is performed.
Figure 18B:
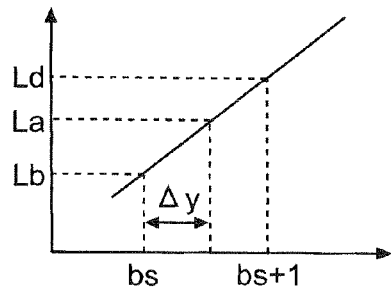
FIG. 18B is a graph showing a vertical relationship between the pixels values of the reference points and the sampling points when the single-pixel movement amount detection is performed.

It is assumed that, as shown in FIG. 18A, deviating horizontally one pixel from the pixel serving as the sample point Ux causes a linear change from the pixel value Lb to the pixel value Lc. Likewise, it is also assumed that, as shown in FIG. 18B, deviating vertically one pixel from the pixel serving as the sample point Ux causes a linear change from the pixel value Lb to the pixel value Ld. Then, the horizontal position $\Delta x$ ($=(La-Lb)/(Lc-Lb)$) serving as the pixel value La between the pixel values Lb and Lc is determined, and the vertical position $\Delta y$ ($=(La-Lb)/(Ld-Lb)$) serving as the pixel value La between the pixel values Lb and Ld is also determined That is, a vector quantity represented by ($\Delta x$, $\Delta y$) is determined as the movement amount within a single pixel between the reference and non-reference pixels.

In this way, the movement amount within a single pixel in each small region "e" is determined. Then, the average obtained by averaging the movement amounts thus determined is detected as the movement amount within a single pixel between the reference image (for example, the actual low-resolution image Fb) and the non-reference image (for example, the actual low-resolution image Fa). Then, by adding the determined movement amount within a single pixel to the movement amount of each pixel obtained by the representative point matching, it is possible to calculate the movement amount between the reference and the non-reference images.

<<Variations>>

In the image sensing devices 1 and 1a of the embodiment of the present invention, operations performed such as by the image processing portion 6, 6a and 6b and the clipping processing portion 60 may be carried out by a control device such as a microcomputer. All or part of the functions achieved by this kind of control device is realized as programs and the programs are executed on a program execution device (for example, a computer), with the result that all or part of the functions may be achieved.

In addition to the above-described case, the image sensing devices 1 and 1a shown in FIGS. 1 and 5 and the clipping processing portion 60 shown in FIG. 2 can be provided either by hardware or by the combination of hardware and software. When the image sensing devices 1 and 1a and the clipping processing portion 60 are configured by software, a block diagram for portions that are provided by the software represents a functional block diagram for those portions.

Although the embodiment of the invention is described above, the scope of the invention is not limited to this embodiment, and many modifications are possible without departing from the spirit of the invention.

The present invention relates to an image processing device that clips a portion of an input image to obtain a desired clipped image, an image processing method and an electronic apparatus, such as an image sensing device, a typical example of which is a digital video camera.

What is claimed is:

1. An image processing device comprising:
   a subject detection portion that detects predetermined subjects from an input image and that sets one of the detected subjects as a main subject and another of the detected subjects as a sub-subject;
   a determination portion that determines a degree of relationship between the main subject and the sub-subject based on degree-of-relationship information, wherein the degree-of-relationship information indicates strength of relationship between the main subject and the sub-subject;
   a clip region setting portion that sets a clip region in the input image based on positions of the main subject and the sub-subject in the input image and the degree of relationship; and
   a clipping portion that clips the clip region from the input image to generate a clipped image
   wherein the degree-of-relationship includes at least one of (a) to (d) below:
   (a) orientations of faces of the main subject and the sub-subject;
   (b) a degree of similarity of face between the main subject and the sub-subject;
   (c) a degree of similarity of color between the main subject and the sub-subject; and
   (d) a ratio between a number of images that are sequentially input as the input image and a number of input images including the sub-subject.

2. The image processing device of claim 1, wherein the clip region setting portion sets the clip region including: the main subject; and the sub-subject having, with the main subject, the degree of relationship that is determined by the determination portion to be close.

3. The image processing device of claim 1, wherein
   the subject detection portion detects the subjects by detecting faces, and
   one of the subjects that has a face corresponding to at least one of:
   a largest face in the input image,
   a face closest to a center of the input image,
   a face recognized as a specific fac; and
   a face specified by a selection signal input from outside is set as the main subject.

4. The image processing device of claim 1, wherein the degree-of-relationship information includes at least one of:
  a distance between the main subject and the sub-subject;
  orientations of faces of the main subject and the sub-subject;
  sounds emitted by the main subject and the sub-subject;
  a degree of similarity of face between the main subject and the sub-subject;
  a degree of similarity of color between the main subject and the sub-subject;
  a degree to which the face of the sub-subject is recognized as a specific face;
  a ratio between a number of images that are sequentially input as the input image and a number of input images including the sub-subject.

5. An electronic apparatus comprising: the image processing device of claim 1, wherein the clipped image output from the image processing device is recorded or displayed.

6. An image processing method comprising, performing the following steps via a processor:
  detecting predetermined subjects from an input image and setting one of the detected subjects as a main subject and another of the detected subjects as a sub-subject;
  determining a degree of relationship between the main subject and the sub-subject based on degree of information, wherein the degree-of-relationship information indicates strength of relationship between the main subject and the sub-subject;
  setting a clip region in the input image based on positions of the main subject and the sub-subject in the input image and the degree of relationship; and
  clipping, from the input image, the clip region to generate a clipped image
  wherein the degree-of-relationship includes at least one of (a) to (d) below:
  (a) orientations of faces of the main subject and the sub-subject;
  (b) a degree of similarity of face between the main subject and the sub-subject;
  (c) a degree of similarity of color between the main subject and the sub-subject; and
  (d) a ratio between a number of images that are sequentially input as the input image and a number of input images including the sub-subject.

7. The image processing device of claim 1, wherein the degree-of-relationship information includes a distance between the main subject and the sub-subject.

8. The image processing device of claim 1, wherein the degree-of-relationship information includes sounds emitted by the main subject and the sub-subject.

9. The image processing device of claim 1, wherein the degree-of-relationship information includes a degree to which the face of the sub-subject is recognized as a specific face.

* * * * *